United States Patent
Subramani et al.

(10) Patent No.: US 10,491,552 B2
(45) Date of Patent: *Nov. 26, 2019

(54) INSERTING CONTENT INTO AN APPLICATION FROM AN ONLINE SYNCHRONIZED CONTENT MANAGEMENT SYSTEM

(71) Applicant: Dropbox, Inc., San Francisco, CA (US)

(72) Inventors: Anand Subramani, San Francisco, CA (US); Anvisha Pai, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,254

(22) Filed: Mar. 8, 2018

(65) Prior Publication Data

US 2018/0198742 A1 Jul. 12, 2018

Related U.S. Application Data

(63) Continuation of application No. 14/697,884, filed on Apr. 28, 2015, now Pat. No. 9,929,990.

(51) Int. Cl.
*H04L 12/58* (2006.01)
*H04L 29/08* (2006.01)
*G06F 17/27* (2006.01)

(52) U.S. Cl.
CPC ............ *H04L 51/08* (2013.01); *G06F 17/276* (2013.01); *H04L 67/02* (2013.01); *H04L 67/025* (2013.01)

(58) Field of Classification Search
CPC ..... H04L 63/10; H04L 67/06; H04L 67/1097; H04L 67/02; H04L 51/08; G06F 17/243; G06F 17/276; G06F 3/048
See application file for complete search history.

(56) References Cited

U.S. PATENT DOCUMENTS 7,243,298 B2 7/2007 Yozell-Epstein et al.
7,882,185 B2 2/2011 Nagarajan et al.
(Continued)

OTHER PUBLICATIONS

Jagan Srinivasan et al., "EMFS: Email-based Personal Cloud Storage," published in: Networking, Architecture and Storage (NAS), 2011 6th IEEE International Conference on, Jul. 28-30, 2011, pp. 1-10.

*Primary Examiner* — George C Neurauter, Jr.
(74) *Attorney, Agent, or Firm* — Polsinelli PC

(57) ABSTRACT

Systems, methods, and computer-readable storage media for inserting content into an application from an online synchronized content management system are disclosed. The system can receive text input into an application at a client device associated with the content management system. The text input can be, for example, keystrokes performed at the client device by a user, and the application can be, for example, an email client. The system can identify, within the text input, a predefined text string, such as an escape sequence, that is followed by a partial or full string that represents an identifier. The identifier may be associated with a content item that is stored in the online synchronized content management system. The system can then insert inside the application a link that points to the content item. The system can also insert code that is designed to render the content item as a dynamically updated preview.

18 Claims, 19 Drawing Sheets

```
<a href="https://www.examplecms.com/s/pm9ba8ewy/Flight%20Data.xls">
    <img src="examplecms.com/xkq3zbmn/dynamicpreview.jpg"
    alt="Flight Data.xls" style="width:640px;height:60px;border:0">
</a>
```

(56) References Cited

U.S. PATENT DOCUMENTS

| | | |
|---|---|---|
| 8,332,748 B1 | 12/2012 | Karam |
| 8,543,656 B2 | 9/2013 | Khoo |
| 8,825,472 B2 | 9/2014 | Raghuveer |
| 9,929,990 B2 * | 3/2018 | Subramani .............. H04L 51/08 |
| 2007/0106736 A1 | 5/2007 | Shepherd |
| 2008/0126983 A1 | 5/2008 | Keohane et al. |
| 2012/0331108 A1 | 12/2012 | Ferdowsi et al. |
| 2014/0173407 A1 | 6/2014 | Kruglick |
| 2014/0181692 A1 | 6/2014 | Gupta |
| 2014/0214856 A1 | 7/2014 | Mahkovec et al. |
| 2014/0230009 A1 | 8/2014 | Subramani et al. |
| 2015/0143211 A1 * | 5/2015 | Kaufthal ............. G06F 17/2235 |
| | | 715/205 |
| 2015/0154156 A1 | 6/2015 | Meyers, Jr. |

\* cited by examiner

```
<a href="https://www.examplecms.com/s/pm9ba8ewy/Flight%20Data.xls">
<img src="examplecms.com/xkq3zbmn/dynamicpreview.jpg"
alt="Flight Data.xls" style="width:640px;height:60px;border:0">
</a>
```

*FIG. 4*

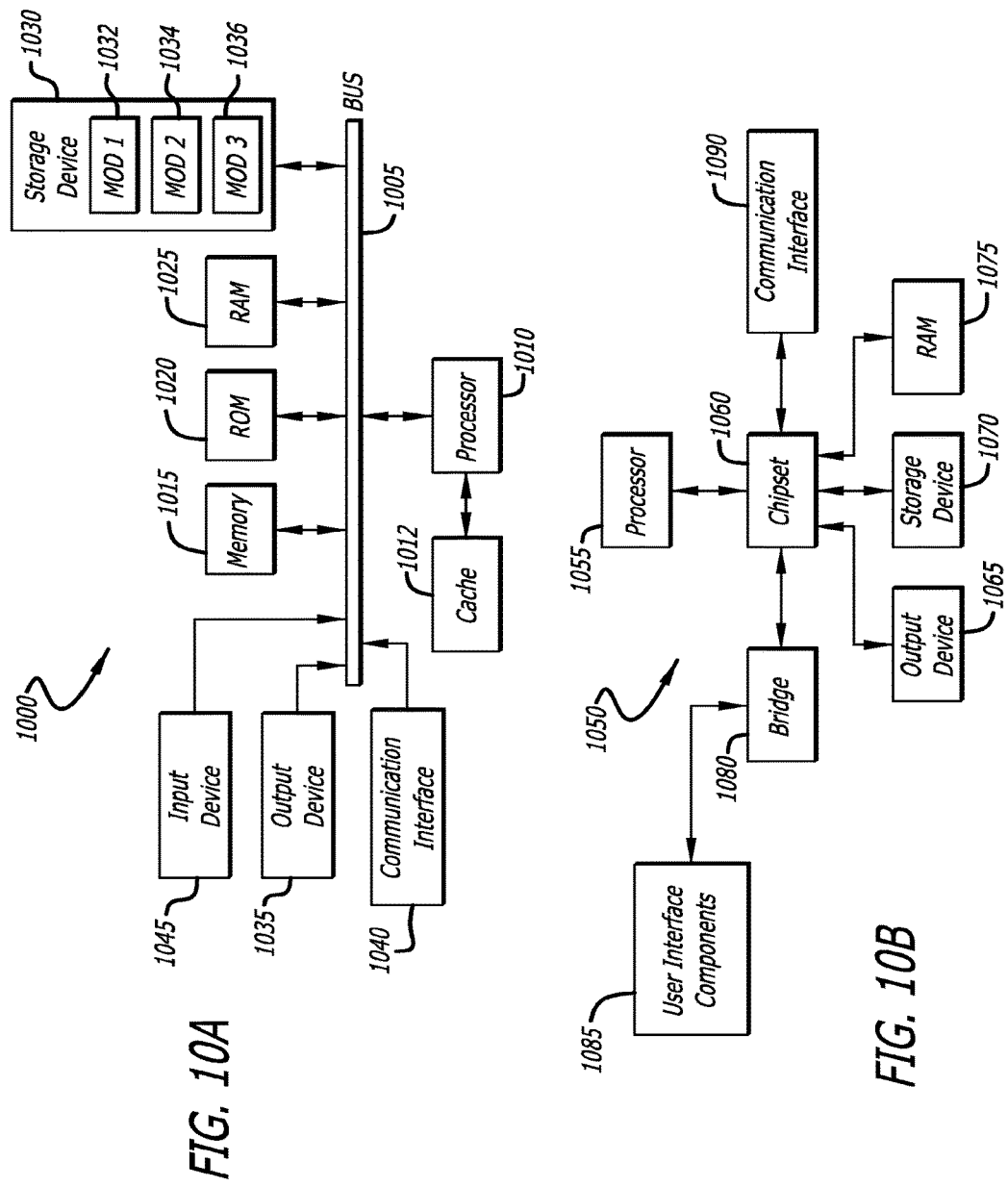

INSERTING CONTENT INTO AN APPLICATION FROM AN ONLINE SYNCHRONIZED CONTENT MANAGEMENT SYSTEM

CROSS-REFERENCE TO RELATED APPLICATIONS

This application is a continuation of U.S. patent application Ser. No. 14/697,884, filed on Apr. 28, 2015, entitled, "INSERTING CONTENT INTO AN APPLICATION FROM AN ONLINE SYNCHRONIZED CONTENT MANAGEMENT SYSTEM", which is incorporated by reference herein in its entirety.

BACKGROUND

Users of synchronized online content management systems, such as Dropbox from Dropbox Inc. of San Francisco, Calif., may store hundreds, or even thousands, of content items in their content management system user accounts. These users frequently attach files and other content items within an email client and other applications by navigating a file chooser invoked through the email composition window or by dragging content to the email composition window. If the email client is not designed to access content in the content management system directly, the user may have to locate and download the desired content item from the content management system onto local storage first, and then upload the content through the email client. This can be inconvenient and cumbersome for users especially if the desired content item is tucked away in an obscure corner of a complex hierarchical folder structure inside the content management system. Inserting a share link to the content item in the email can be also prone to errors. While trying to obtain the link from the content management system and type it into the email composition window, the user may introduce typographical errors into the link and render the link inaccessible.

Additionally, when another user receives the email with the attachment, the recipient generally has to download the attachment before she is able to access the attached content. Although some email applications offer a functionality to view a preview of certain types of content inline, these previews are limited to files that are attached to the email and no previews are generated for links to content stored in an online content management system. Moreover, usually it takes several steps to add an attachment from a content management system account or save an attachment to the user account with the content management system.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for inserting content stored in an online synchronized content management system, such as Dropbox, into an application such as an email application, a web browser, a word processor, etc. The system can receive some text as it is being input into an application at a device by a user. For example, the user, who has a user account with an online synchronized content management system, may use her client device such as a smartphone to run an application and start typing on the mobile app. The user may wish to attach or insert some content stored in the content management system into the mobile application that she is currently using. According to the disclosed methods, instead of having to download a local copy of the content and insert it to the application, the user can simply type inline the name (i.e., identifier) of the content item that she desires to include in the application.

The system can monitor the user's text input and recognize an identifier that is associated with the specific content item that she wishes to insert into the application. The identifier can be an automatically generated or user-defined character string that is based on one or more attributes of the corresponding content item, such as its filename. The identifier may have to be preceded by an escape sequence, which is a specific and predefined series of characters that is configured to switch the system into a different state where the system would be recognizing any characters that follow as part of the content item identifier or a search query until the system state is once again switched back to a normal mode. The escape sequence can consist of one or more characters arranged in a specific order. As the user starts typing the identifier after the escape sequence, the client device can communicate with the content management system server to make educated guesses as to which content item that the user might be looking for based on the partially typed identifier. Accordingly, the application can make several suggestions to the user. This can be done by displaying a pop-up window that contains the likely candidates for the content to be inserted. The user can continue to type in the identifier to narrow the search, or she can make a selection from the suggested list to expedite the process.

Once the application determines which content item to insert, it can either insert a link to the content item or code that can render a preview of the content item. The decision of which object to be insert can be made by a user at the time of the insertion or be dictated by a previously created user setting. The link can be a hyperlink based on the share address of the content item. On the other hand, the preview can be a truncated version of the actual content item and can be presented in a visual, audible, or audiovisual way. For example, the preview can be a thumbnail image of a picture or a clip of a video. The preview can also include the link to the content item. Furthermore, the preview can be dynamically updated. In other words, the preview can be updated even after the code is inserted into the application. Thus, if the underlying content is updated, then the preview, when it is rendered, can also reflect the changes that have been made to the content.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 shows exemplary code that may be inserted into an application;

FIGS. 10A and 10B show exemplary system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an improved technique for inserting or embedding a piece of content in an application where the content originates from a synchronized online content management system. The disclosed technology can improve the user experience of including, attaching, or embedding a content item in applications such as an email client, a web browser, a word processor, a communicator, a text messenger, an instant messenger, and the like, especially on mobile devices. Instead of having to interact with a separate user interface element such as an "attach" or "link" button, a user can reference content by simply typing the identifier associated with the content item to be inserted. Thus, for example, a user who is composing an email on a web browser can attach a file stored in a content management system by typing in the filename of the file and without having to move her hands away from the keyboard to interact with a mouse. The disclosed technology represents a universal and generic way of referencing external content in any application.

In some cases, the system can intelligently discern which content item the user is attempting to include by analyzing the partial string of text that has been input into the application. The content identifier contained in the user's input may be preceded by a predefined text string that functions as an escape sequence for identification purposes.

Figure 1:
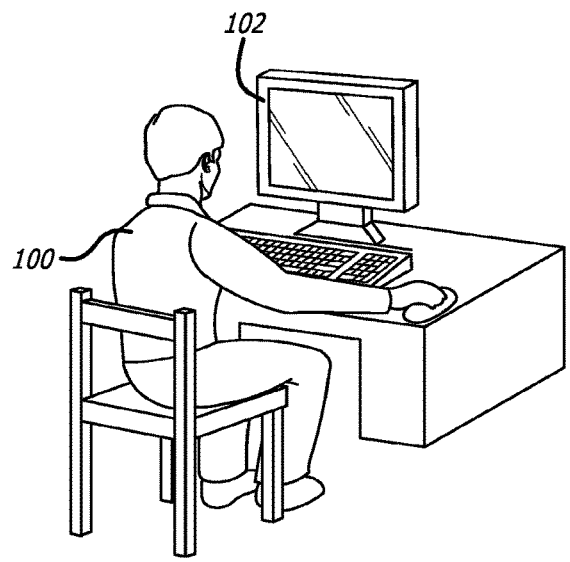
FIG. 1 shows an exemplary client device being accessed by a user of a content management system.

FIG. 1 shows an exemplary client device being accessed by a user of a content management system. In this example, desktop computer 102 is being accessed by user 100. User 100 may have a user account with an online content management system, such as a fictional content management system named ExampleCMS, which may be accessed via the web at an exemplary domain name of "examplecms.com." User 100 can access the content management system on various client devices (also known as "user devices") such as desktop computer 102, as well as a laptop computer, a tablet computer, a set-top box, a mobile device, a smartphone, a wearable computing device, a dongle, etc. The user device(s) may have the capability to communicate with the content management system via a network (not shown) such as the Internet. User 100 can access his user account and its associated content data by using a desktop application, such as a web browser, on his desktop computer 102.

Although FIG. 1 shows user 100 as using desktop computer 102, one skilled in the relevant art will understand that user 100 may also access ExampleCMS from other access platforms such as the various types of computing devices mentioned above. For example, user 100 may use a first access platform, such as desktop computer 102, to access the content management system, and then hop on to a second access platform, such as a mobile device, to continue accessing the content management system. In another example, user 100 can log on to the content management system on a dedicated client app on a tablet PC as the first access platform, but choose to continue the access on the same tablet PC's web browser as the second access platform. It may also be possible to access the content management system via the first access platform and the second access platform concurrently.

Figure 2:
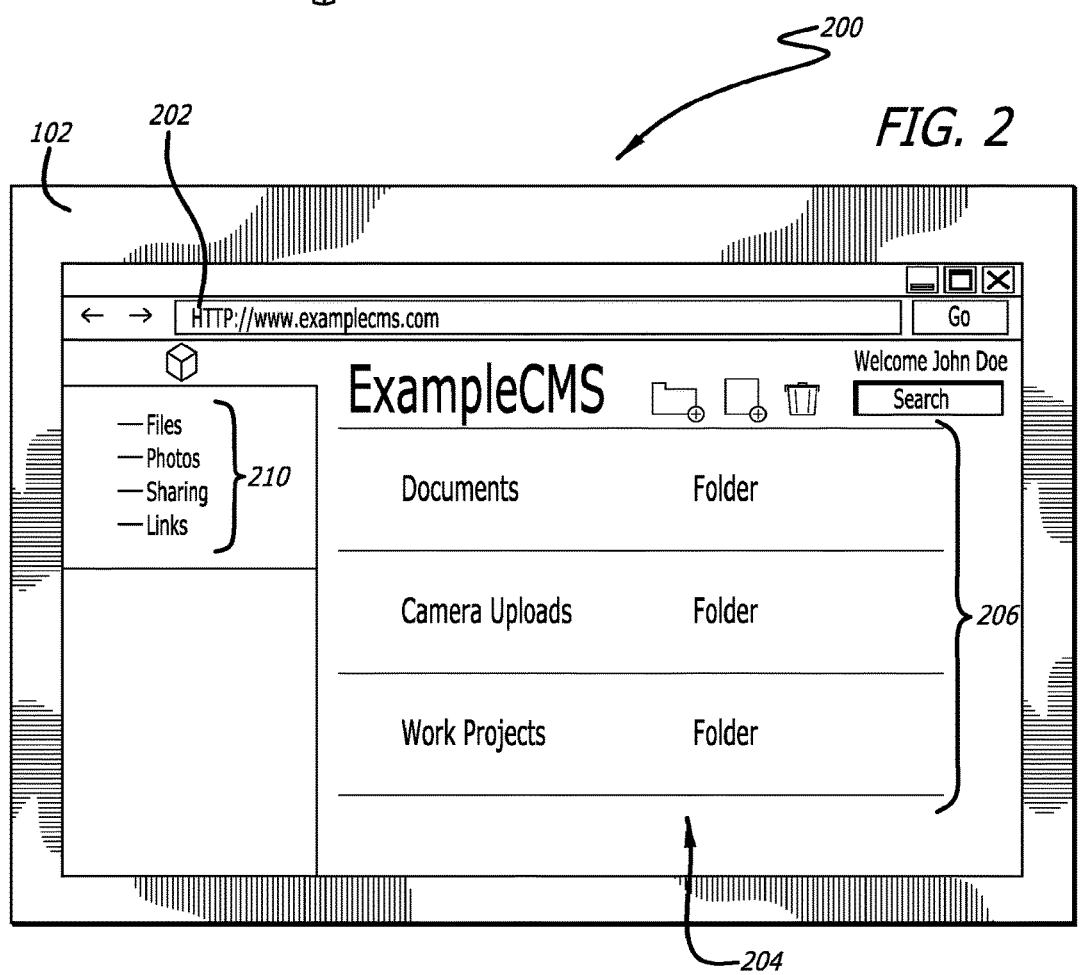
FIG. 2 shows an exemplary embodiment of a user interface for accessing the content management system.

FIG. 2 shows an exemplary embodiment of a user interface for accessing a content management system. A user, such as user 100 from FIG. 1, can use a client device, such as desktop computer 102 from FIG. 1, to access content stored in the content management system. The user can navigate to the content management system's web address 202, such as "http://www.examplecms.com," and use web interface 204, as displayed on a web browser running on desktop computer 102. Web interface 204 may display the content management system's logo (i.e., "ExampleCMS"), login information (i.e., "Welcome John Doe"), a search bar, menu items 110, icons, links, and commands. For example, menu items 110 may allow the user to select different commands via web interface 204, such as "Files," "Photos," "Sharing," and "Links." Other graphical elements such as icons may allow the user to create folders, upload files, or delete files. Content display area 206 may display a list of individual files and folders that are associated with the user account. For example, FIG. 2 shows three folders, "Documents," "Camera Uploads," and "Work Projects," in content display area 206.

Figure 3A:
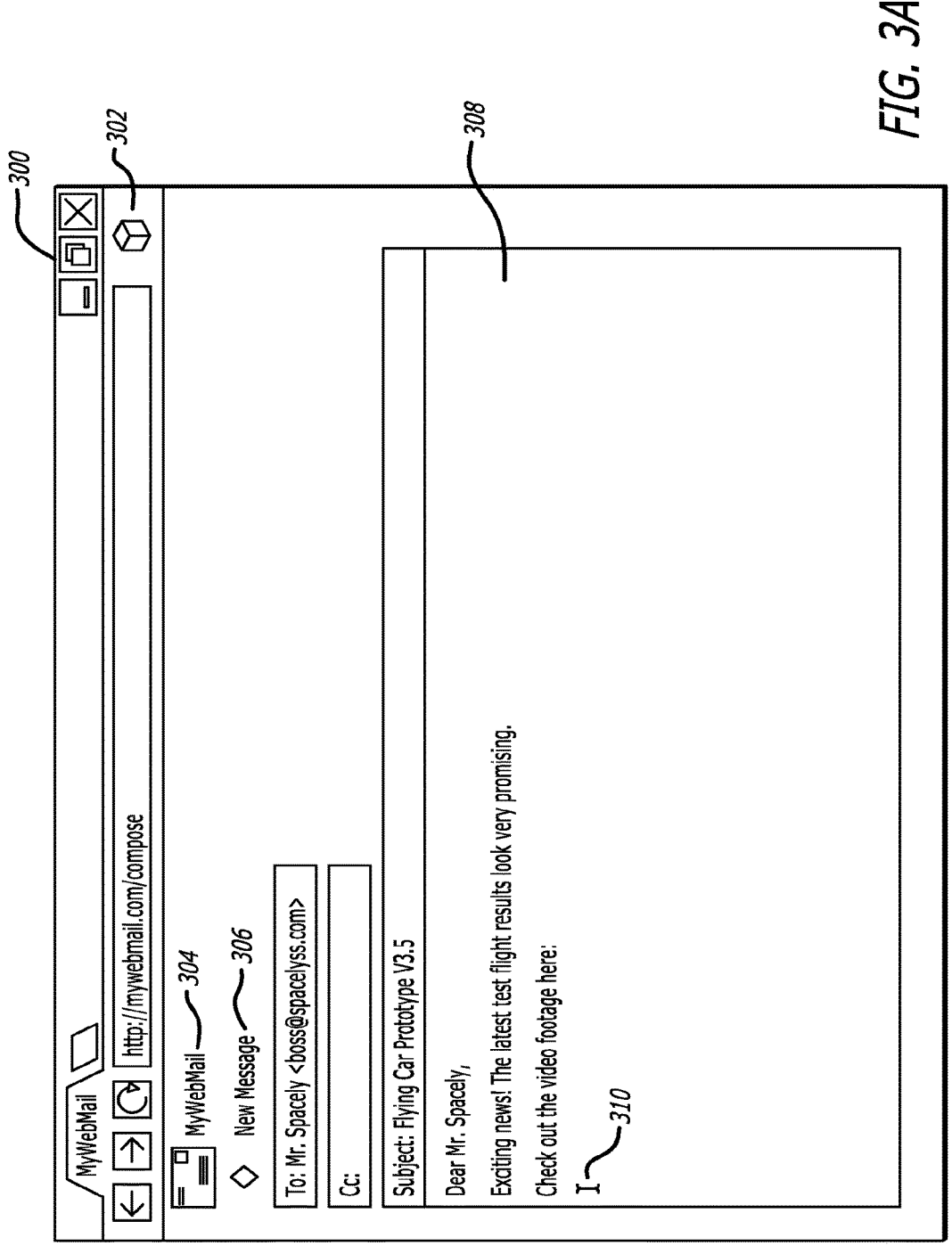
FIGS. 3A-H show exemplary embodiments of inserting a link or code into an application.

FIGS. 3A-H show exemplary embodiments of inserting a link or code into an application. FIG. 3A shows an exemplary user interface where a user may input information, such as text, by using an input device, such as a keyboard. However, the input device need not be limited to a physical keyboard. For example, one of skill in the art will understand that data can be input by using a keyboard, a virtual keyboard, a mouse, a trackpad, a stylus, a touch-sensitive display, voice recognition equipment, gesture recognition equipment, etc. In this example, application 300 is a web browser. However, application 300 can be other types of applications such as an email client, a text editor, a word processor, a spreadsheet, a presentation tool, a communicator, a chat messenger, an instant messenger, a text messenger, etc. Application 300 need not be strictly limited to a piece of application software, either. As such, application 300 can be part of system software or an component included in yet another application. For example, application 300 can be a text box, a text editor, or an input window of another application. In another example, application 300 can be a search window in an operating system's graphical user interface (GUI). However, in this particular example shown in FIG. 3A, application 300 is a web browser that has web browser plugin 302 installed.

Browser plugin 302 can be a piece of software that can interoperate with a web browser to offer additional functionalities for the user. Browser plugin 302 can, for example, read in content from websites, parse through content and find pertinent data, trigger actions, communicate with a server, insert or display data in the web browser, etc. Browser plugins 302 can be created by third-party software developers other than the developers of the web browser. In the examples shown in FIGS. 3A-3H, plugin 302 is created and supplied by the same developer or organization that is responsible for the exemplary content management system, ExampleCMS. Thus, browser plugin 302 can be configured to intercept keystrokes, recognize specific text strings in application (i.e., web browser) 300, communicate with ExampleCMS' servers, and/or manipulate data that is presented in application 300 inside a client device. However, one of skill in the art will also recognize that other types of software such as applications, extensions, plugins, add-on software, macros, scripts, application programming interfaces (APIs) can be used to perform those same tasks depending on the type of application 300. For example, if application 300 is an operating system, an operating system plugin can be used to perform the same or similar tasks that browser plugin 302 is doing. In another example, if application 300 is a word processor, a macro can perform various methods that are disclosed herein in a substantially similar or same way as browser plugin 302. In some aspects, the various functionalities of browser plugin 302 can be integrated into application 300 itself. Thus, application 300 can perform the various methods of inserting content without the need of an additional piece of software.

In the examples shown in FIGS. 3A-3H, the user is currently using web browser 300 to navigate to an exemplary web email service called "MyWebMail" 304 at the web address "mywebmail.com." The user can compose new message 306 using text input area 308. Text input area 308 can be a text editor that can handle not just simple text input but also rich text formatting such as bold, italics, underlined, bulleted lists, variable font size, etc. Text input area 308 may also allow users to include a link, such as a hyperlink, or code, such as HyperText Markup Language (HTML) code or a script.

In this example, an exemplary user named George has composed an email addressed to his boss about the results of his fictional flying car prototype's recent flight test. George would like to attach a video clip file of the flight test called "OrbitCityTestFlight.mov" into the email addressed to his boss, but the video clip is stored in his user account with the content management system, ExampleCMS. One way to attach the video clip would be to download the video file on to the local storage of the client device and include the file to the email as an attachment. However, video files are typically very large in size and an email with such a large attachment may not get delivered to its intended recipient because some email servers have a policy of rejecting messages with attachments that are too large. Plus, downloading a file from an online content management system and uploading the file to a mail server can be a long and cumbersome process involving numerous steps and user interaction with the client device.

Another way of including the video clip in the email can be to obtain a share link of the video clip from the content management system and manually type the address into application 300. For example, George can obtain an exemplary sharing address, "https://www.examplecms.com/s/mj4h21g1s/OrbitCityTestFlight.mp4?dl=0" from ExampleCMS and manually insert the address into text input area 308 at text insertion point (i.e., text cursor) 310 by using his keyboard. This method can be also cumbersome to the user because the user may have to remember and replicate a long string of text or copy and paste the long string from one location to another. The user may also need to move his hands away from one input device such as a keyboard to another input device such as a mouse, or sometimes move back and forth between multiple input devices to accomplish the multi-faceted task. These annoyances can be compounded if the user needs to attach not just one but numerous content items to the same application. As will be shown in the next set of illustrations, the disclosed methods offer more convenient and efficient ways to insert content such as a video clip to applications such as a web-based email client.

Figure 3B:
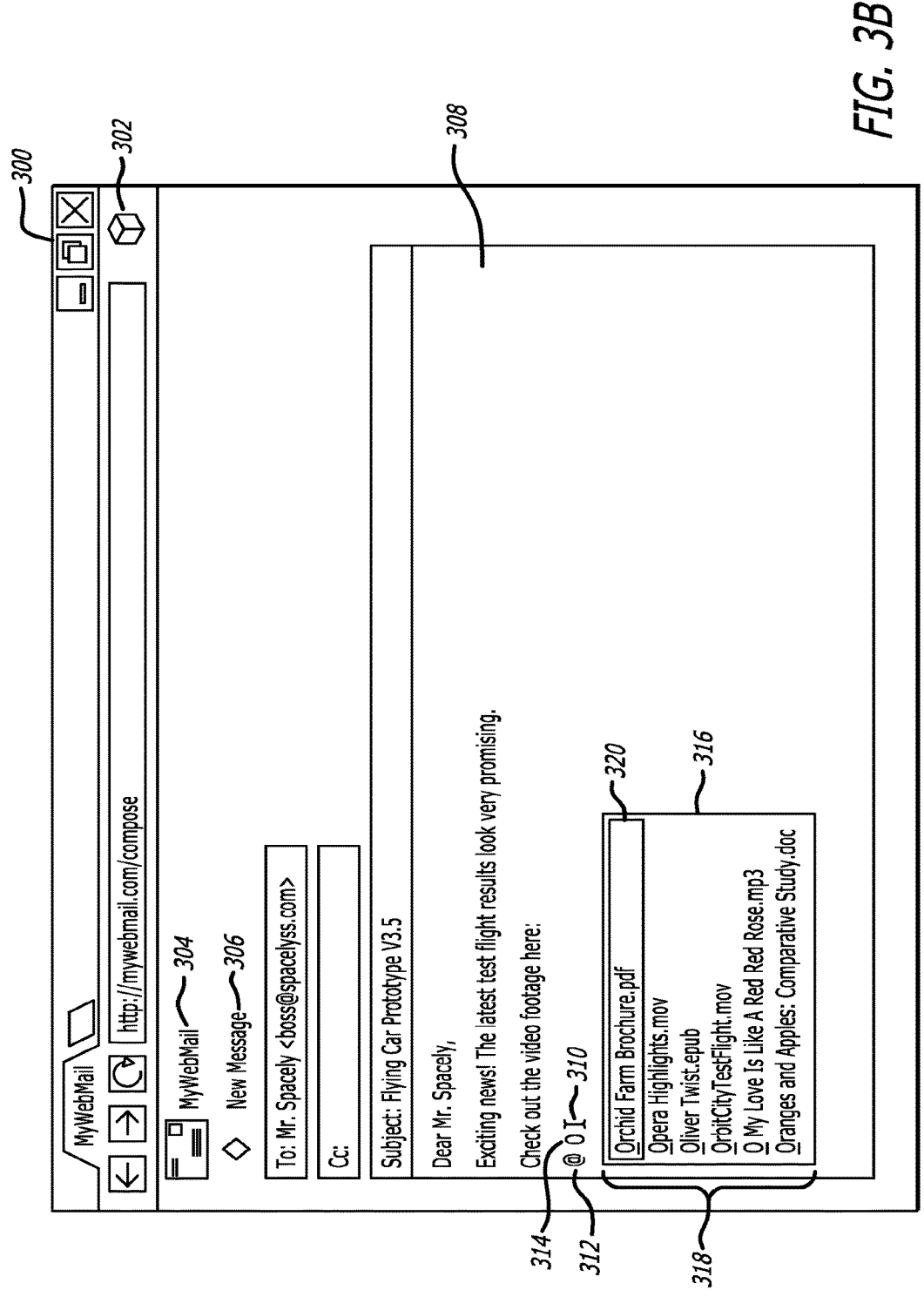

Now referring to FIG. 3B, the user can insert the desired video clip by starting to type identifier 314 that is associated with the video clip. Identifier 314 can be associated with one or more content items stored in the content management system, although it is preferable that it is associated with just one content item such that the association can be a unique one-to-one relationship. Users can type in identifier 314 as a shorthand or a stand-in for the full link address or embed code for the corresponding content item. Identifier 314 can be created based on one or more attributes of the associated content item such as filename, author, creation date/time, tag, file structure, file size, file type, file extension, content data, etc. For example, identifier 314 for the content item "OrbitCityTestFlight.mov" can be simply "OrbitCityTestFlight," dropping some extraneous information such as the file extension. It would be also possible to further shorten identifier 314 to something like "TestFlight." In another example, identifier 314 can be "Personal/OrbitCityTestFlight" to distinguish it away from another file with the identical filename that may be stored in a different folder named "Business." Identifier 314 can be automatically assigned by the content management system according to some predefined rules (e.g., filename minus file extension plus creation date), or it can be customized by the user. As such, the content management system may allow a user to assign names, nicknames, or aliases to his various content items. This may be beneficial when some of the automatically assigned identifiers turn out to be too long or too difficult to remember. For instance, a user may choose to assign a succinct and easy-to-remember identifier "todolist" to a document that he accesses and shares on a daily basis. When the user wishes to attach the document to an application, he may simply refer to it as "@todolist," assuming that "@" is the escape sequence.

Moreover, identifier 314 can be preceded by escape sequence 312 such that application 300 is better able to recognize identifier 314 among the user's other input text. Escape sequence 312 can be a predefined string of text that consists of one or more alphanumeric characters arranged in a predefined order. For example, escape sequence 312 can consist of a single ampersand symbol ("@"). In other examples, two or more characters can make up escape sequence 312, such as "~@", "^&", "***", "z5q", "\\", etc. However, one of skill in the art will understand that escape sequence 312 is more useful when it contains seldom-used characters in unusual or atypical combinations such that non-identifier characters or strings may not be misconstrued as identifier 314. For instance, the three-character combination "and" would be a poor choice for escape sequence 312 because "and" represents a combination of characters that occur extremely frequently in the English language. When application 300 encounters escape sequence 312 while monitoring the input text, application 300 can switch into a different state where application 300 recognizes any characters that follow escape sequence 312 as part of identifier 314 until the application 300 switches back into a normal mode. That switch back can occur when application 300 encounters another predefined sequence of one or more characters. Typically, this can be a simple white space such as a blank space, a tab, a carriage return (CR), a line feed (LF), or an enter (CR/LF). In other examples, escape sequence 312 may surround identifier 314. For example, a set of opening and closing double brackets (i.e., '[[' and ']]') can be used to demarcate the beginning and end of identifier 314 (e.g., "[[OrbitCityTestFlight.mov]]").

In some aspects (not shown in FIG. 3B), application 300 can wait until the user finishes entering escape sequence 312 and identifier 314 before starting to search for the associated content item. For example, after the user enters the key string "@OrbitCityTestFlight" and signals the end of the input of identifier 314 by pressing a space bar key or an enter key, application 300 can (after communicating with the content management system) insert an appropriate link or code into text input area 308. Even if there is no exact match of the inputted key string to any of the content items in the content management system, application 300 can use the closest match or suggest one or more closest matches to the user to select from.

Alternatively, as shown in FIG. 3B, application 300 can monitor the user's input into text input area 308, recognize escape sequence 312, and suggest one or more likely candidates 318 to the user as soon as the user starts typing identifier 314. In this example, George has just typed a single character "O" at text insertion point 310 after typing escape sequence 312 (i.e., "@") with the intent of spelling out "OrbitCityTestFlight," which happens to be the predefined identifier for the movie clip he wishes to include in the email in this example. Thus, in essence, identifier 314 or its partial string thereof can function like a search query. In turn, application 300 can present a list of candidates 318 of content items in candidate presentation area 316. Candidate presentation area 316 can be a pop-up window, a dropdown list, a collection of radio buttons, a picker, etc. Candidates 318 can be selected and sorted according to various criteria such as string proximity, file type similarity, date/time proximity, access frequency, access recentness, sharing status, user preference, user ratings, context awareness, etc. Application 300 can communicate with the content management system to transmit the full or partial string that represents identifier 314 and receive content item candidates 318 from the content management system. The selection and sorting of candidates 318 can be performed by the client application, the server, or a combination of both. These tasks can be performed by add-on software such as browser plugin 302 or by application 300 itself.

Current choice indicator 320 denotes a currently selected content item. The user can interact with application 300 to move among presented content item candidates 318, for example by using the arrow keys on the keyboard, and select the desired content item at any time, for example by using the enter key on the keyboard. For example, upon discovering "OrbitCityTestFlight.mov" as the fourth choice in candidate presentation area 316, the user can use the arrow and enter keys on the keyboard or tap on the touch screen to select the fourth entry in the list, at which point application 300 can enter an appropriate link or code to text input area 308 without having to wait for the user to finish typing the rest of identifier 314.

Figure 3C:
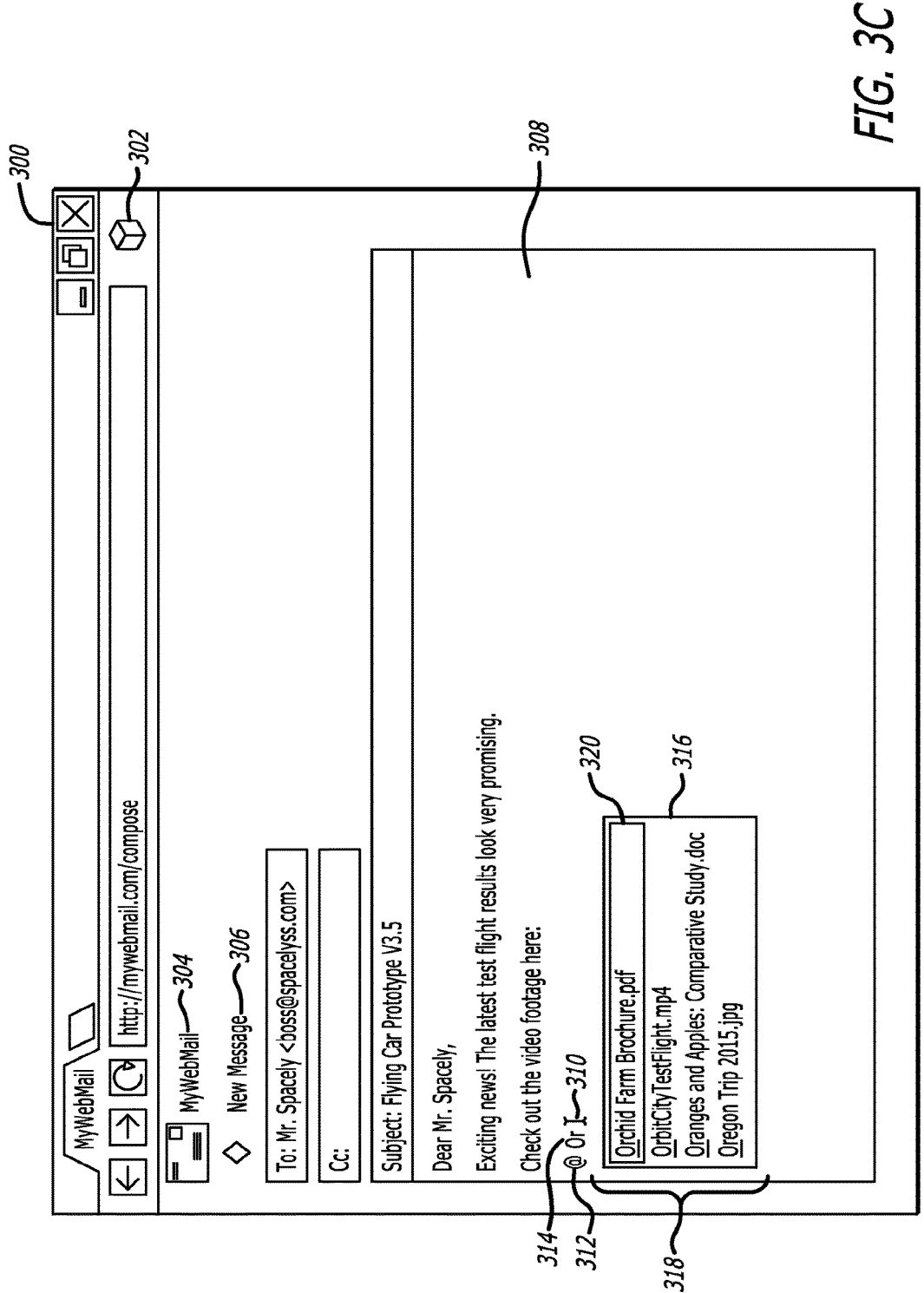

Referring now to FIG. 3C, the user George has now typed in one more character "r" where text cursor 310 used to be within text input area 308. The partial string of identifier 314 now reads "Or." Accordingly, application 300 and/or plugin 302 can communicate with the content management service server to update the list of candidates 318. Application can then repopulate pop-up window 316 with the updated list of candidates 318. Updated candidates 318 may include some old candidates as well as new ones. Since the user has provided additional information on top of what was already provided in FIG. 3B, application 300 has also narrowed down the list of candidates 318.

Figure 3D:
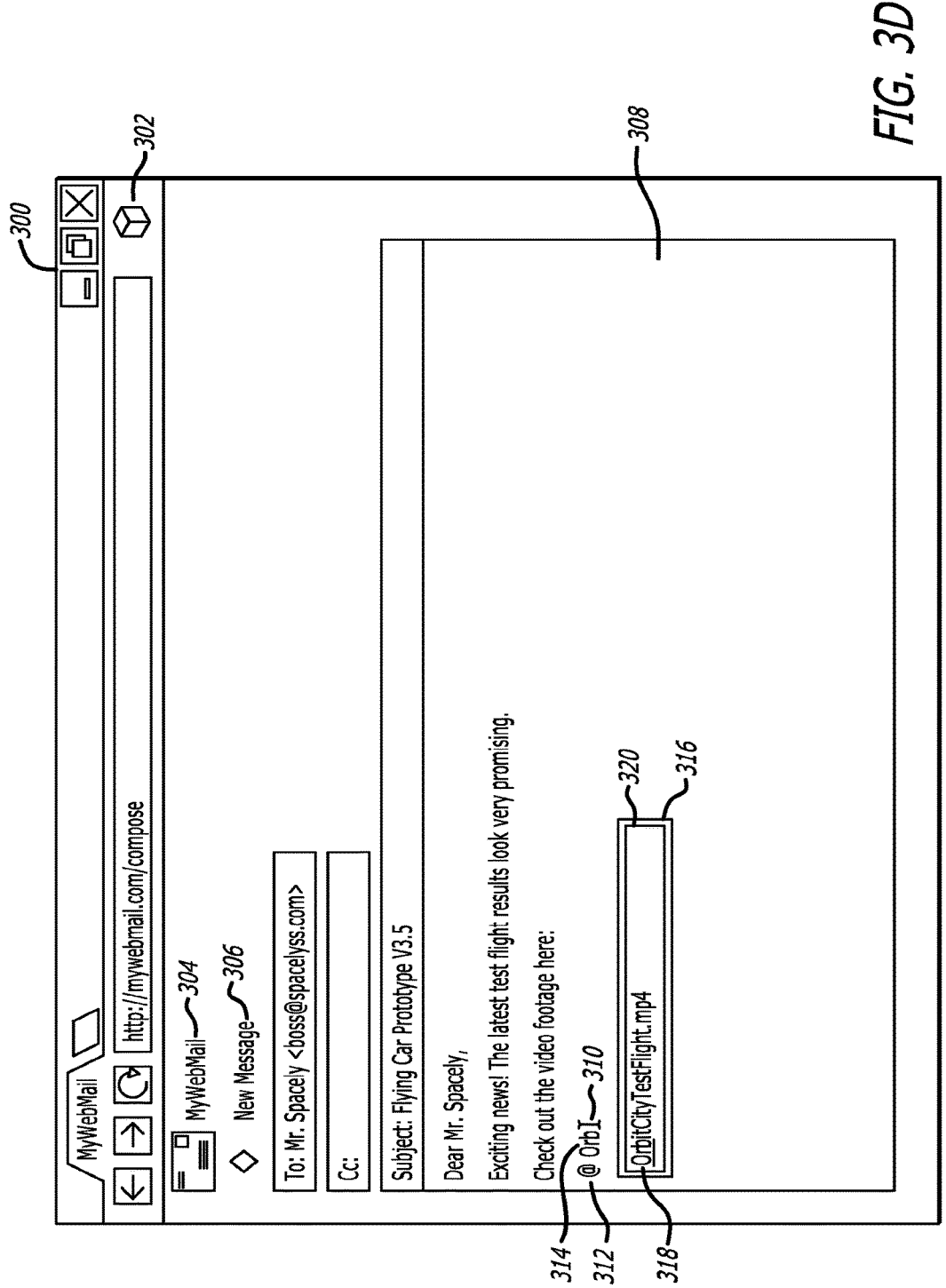

Referring to FIG. 3D, the user has typed yet another character "b." Application 300 and/or plugin 302 can transmit partial query string 314 to the server and receive from the server candidate list 318 that has been updated once again. The new list, now containing only one candidate, can be displayed in candidate presentation area 316 of application 300. The user can either continue to type or select the only choice left in candidate list 318.

Figure 3E:
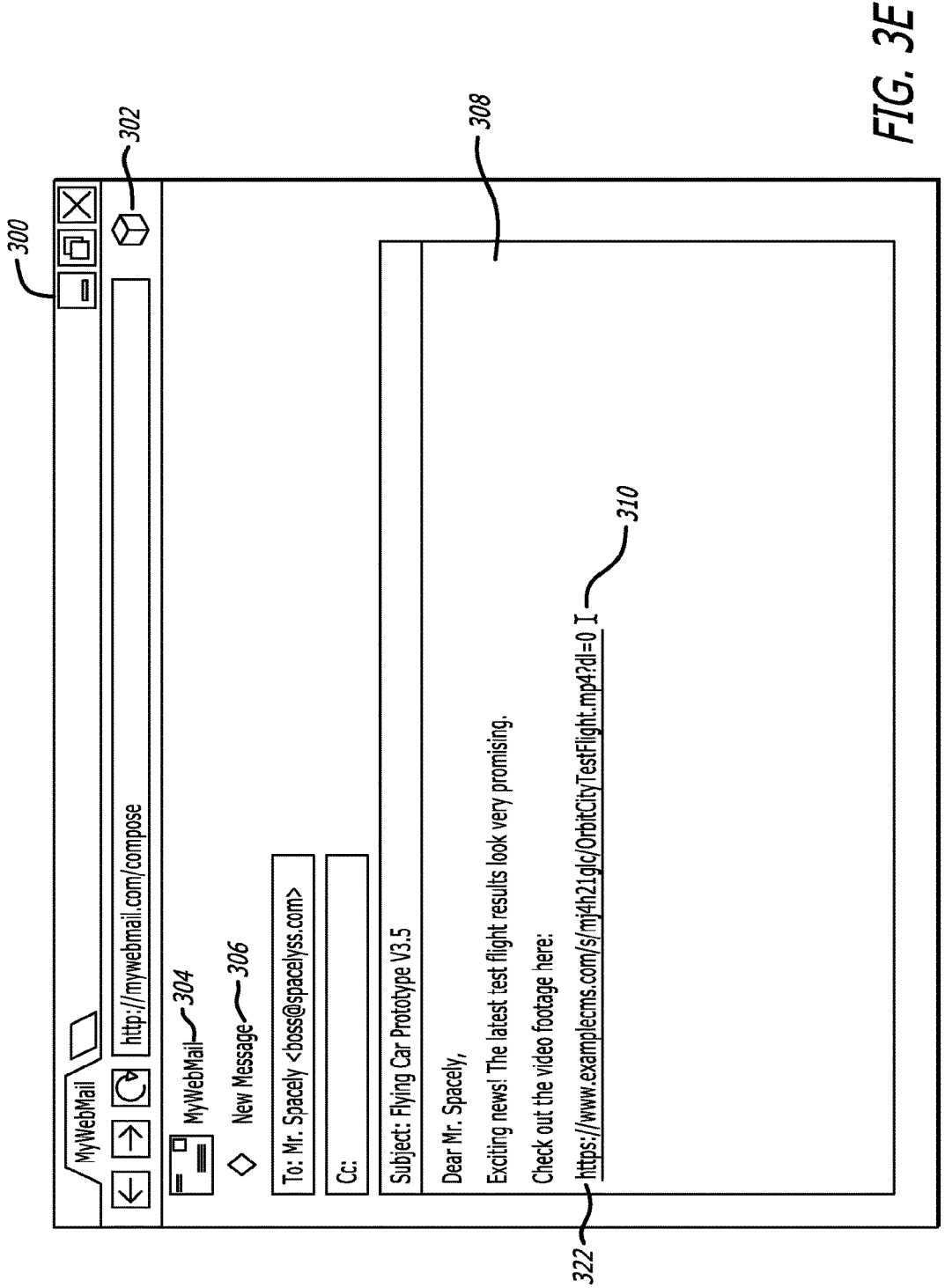

Now referring to FIG. 3E, once the user has made the selection of a content item from the list of suggested content items, application 300 and/or plugin 302 can insert access link 322 inside text input area 308 of application 300. Link 322 can replace the user-submitted escape sequence 312 and full or partial identifier 314. However, one skilled in the relevant art will understand that link 322 need not replace escape sequence 312 and identifier 314 but simply supplement the existing escape sequence 312 and identifier 314. The user can then choose to delete escape sequence 312 and/or identifier 314 if he so desires. Link 322 can be a hyperlink that points to a universal resource locator (URL) for the content item that corresponds to identifier 314 or the content item that was selected by the user from pop-up window 316. The URL may contain a token string consisting of unique character combinations (e.g., "mj4h21g1c") and mapping to the target content item. By interacting with link 322, for example by clicking on or tapping link 322, the user can navigate directly to the corresponding content item and access the item by opening, downloading, or editing the item. As shown in this example, by using only a few keystrokes (i.e., escape sequence 312 and the first few characters of identifier 314), George was able to insert the entire string of link 322 into text input area 308 of application 300.

Figure 3F:
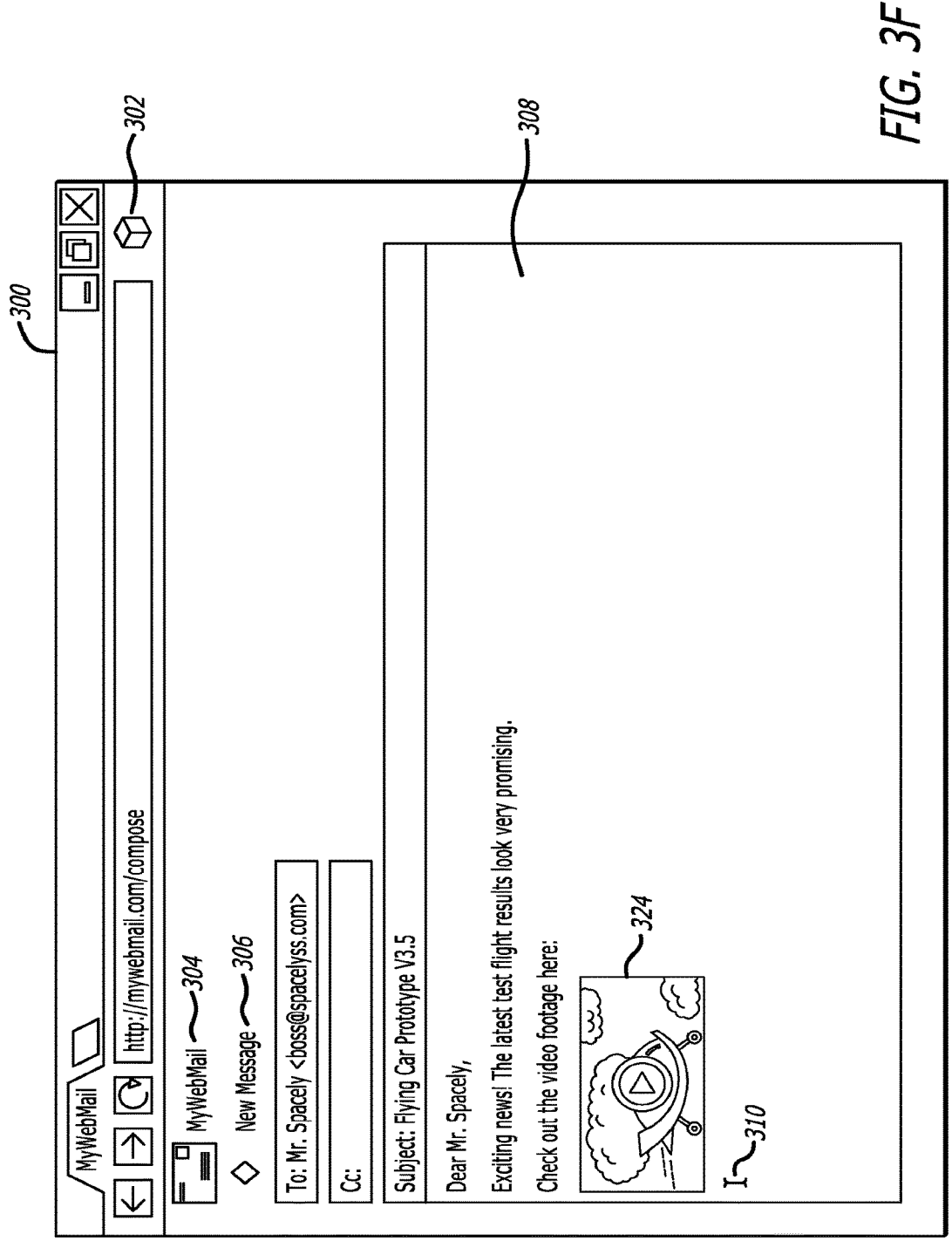

FIG. 3F shows an alternative object that application 300 and/or add-on software 302 can insert. Once application 300 and/or add-on software 302 identifies a specific content item to insert based on identifier 314 and/or other user input, application 300 and/or add-on software 302 can insert a preview of the content item rather than just a link. The preview can be a rich inline preview of the content item, such as an image, a slideshow, a video clip, an audio clip, an interactive animation, or any other means of audio/visual presentation. The preview can be also interactive and dynamically updatable. In other words, the user can interact with the preview (e.g., click on or tap the preview) to manipulate it. For example, the user can click on the play button to play the video clip. Application 300 or the server can determine the resource type (i.e., content type) of the content item and generate an appropriate type of preview that matches the resource type. The resource type can be based on the Multi-Purpose Internet Mail Extensions (MIME) classifications. For example, the preview can be a thumbnail image if the content item is a picture (a slideshow if more than one picture is being inserted), a video player if the content item is a video clip, an audio player if the content item is an audio clip, etc. The preview can be a snapshot or a truncated portion of the content item. For example, the preview can be a captured still image from a video clip. In another example, if the content item being inserted is a word processor document, application 300, plugin 302, and/or the server can take a snapshot of the front page of the document, shrink it down, and place it inline as a thumbnail picture inside application 300. As will be discussed more fully below, this picture of the word processor document can be dynamically updated as the underlying document gets updated.

Application 300 and/or plugin 302 can insert the preview into input area 308 by inserting code. The code, for example, can be HTML code or Extensible Markup Language (XML) code. The code can also be written in a scripting language such as JavaScript or an application-specific macro or script. For example, the code can be written in Visual Basic or field codes for Microsoft® Word® word processor. The code can include a link to the content item. Once inserted into application 300, such code can be rendered by application 300 or other applications as a more user-friendly visual representation such as preview 324. Rich preview 324 can be dynamically updated according to the underlying content item. In other words, if the corresponding content item is updated even after preview 324 is inserted into the email, preview 324, when it is rendered at the receiver's email client, can still reflect all the changes that have been made during the intervening time. This can be made possible by configuring the inserted code to request a resource from a server such as the content management system server. At render time, the rendering application (e.g., receiver's email client application) can request this resource (e.g., thumbnail image file) from the server, and the server can generate and provide a new up-to-date thumbnail image based on the latest version of the content item to be rendered at the rendering application.

Application 300, plugin 302, and/or the content management system server may store thereon one or more code snippets to be used as templates for generating rich previews for different resource types. For instance, application 300 may have a code template for rendering a thumbnail image, another code template for rendering a video player, and yet another code template for rendering an audio player. After determining the resource type for the content item, application 300 and/or plugin 302 can retrieve the appropriate code snippet for the identified resource type and use it as a template. After plugging in necessary variables such as a resource address, alternative text, preview size, etc., application 300 and/or plugin 302 can insert the resulting code into text input area 308.

Figure 3G:
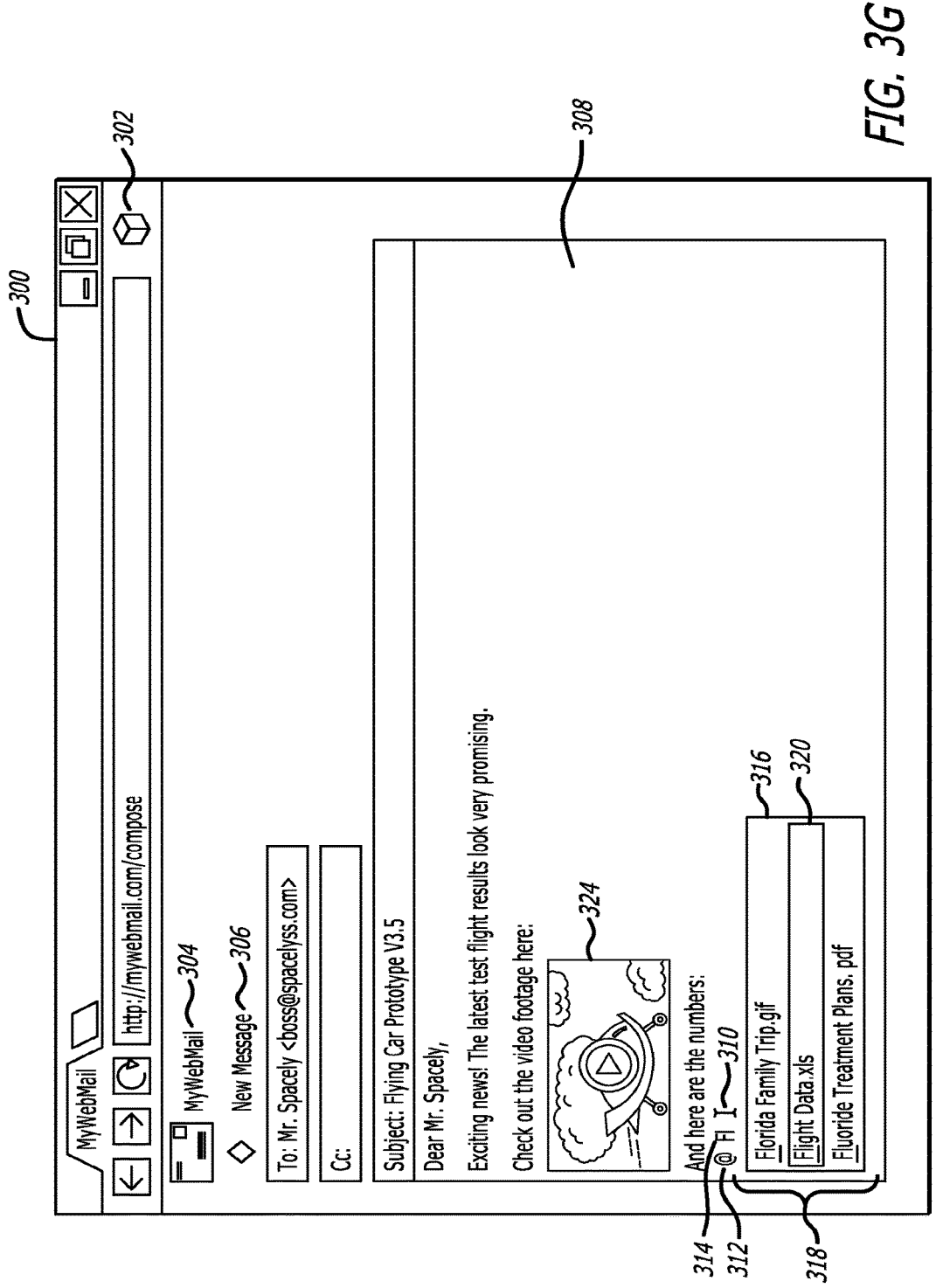

Moving on to FIG. 3G, the user George may continue to compose the email and decide to attach another resource from the content management system to the email. In order to do so, the user types another escape sequence 312 and proceeds to enter the first two letters of identifier 314 for the content item. Again, application 300 and/or plugin 302 communicates with the server to retrieve the most likely candidates 318 and present them in candidate presentation area 316. The user can make selection 320 of the desired content item without finishing to spell out identifier 314.

Figure 3H:
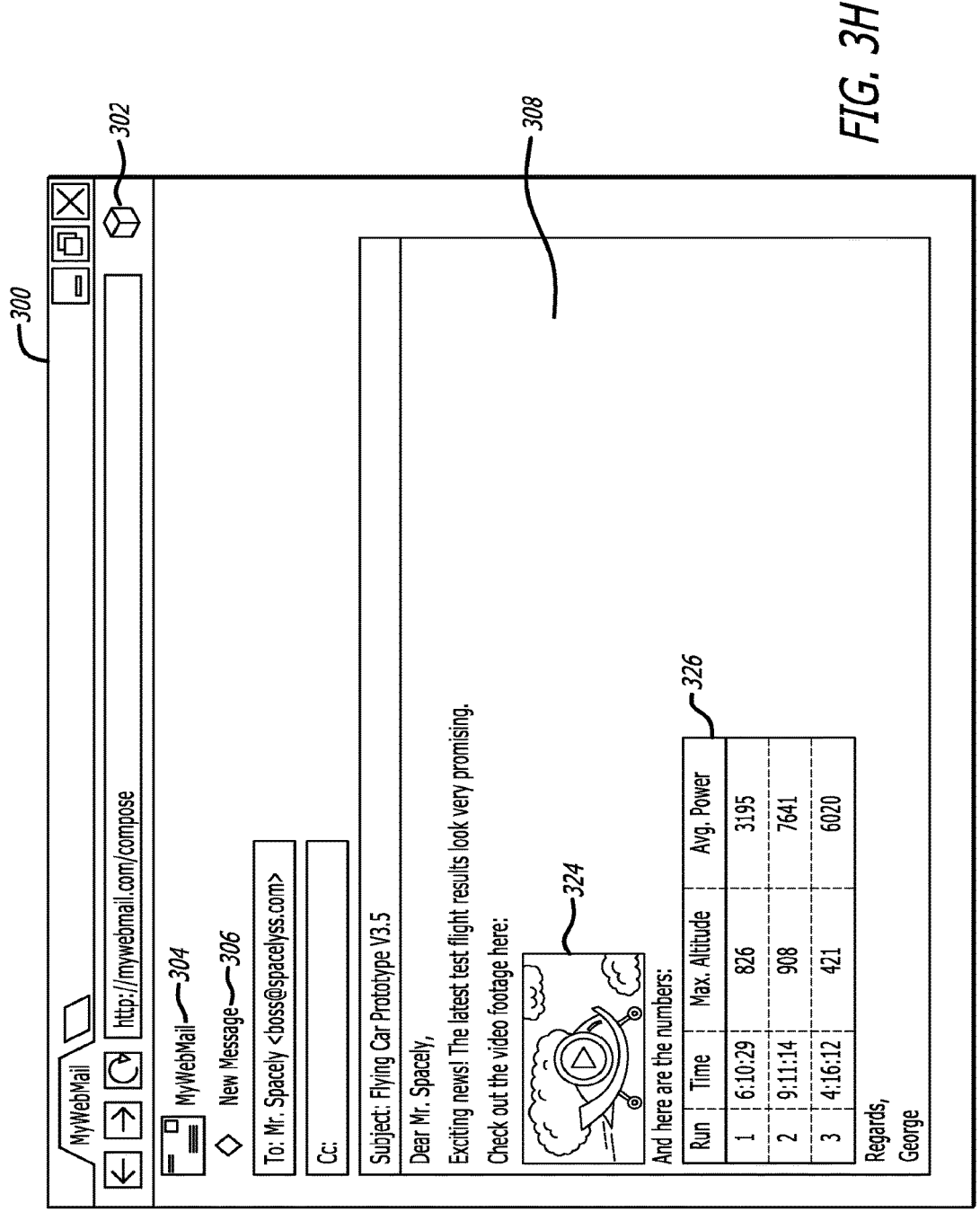

Now referring to FIG. 3H, application 300 and/or plugin 302 may determine that the resource type of the selected content item is a spreadsheet. Thus, application 300 and/or plugin 302 retrieves a code snippet that is designed to render a preview of a spreadsheet document inside the email. In some aspects, the code can be configured to embed an interactive spreadsheet application inside web browser 300. In some other aspects, the code can be configured to retrieve a non-interactive snapshot image of the spreadsheet document from the server and render the still image inside an application such as an email client. However, the still snapshot image can be still dynamically updated if the underlying file is modified. That is, the code can be configured to retrieve a freshly generated snapshot image from the server at a render time. Alternatively, rich preview 326 can be truly dynamic. In other words, application 300 and/or plugin 302 can insert code, written in a scripting language, that can periodically communicate with the server to constantly update the preview image or receive updated images that are pushed from the server.

Although exemplary identifiers 314 shown in FIGS. 3B-H are mainly based on the filenames of the corresponding content items, application 300 and/or plugin 302 may allow the user to locate a desired content item by other metadata as well, such as an author (e.g., entering "@elroy" may retrieve content items created by "elroy"), a username (e.g., entering "@elroy" may retrieve content items belonging to "elroy"), a file type (e.g., entering "@music" may retrieve music files), content (e.g., entering "@salmonella" may retrieve word processor documents that include the word "salmonella" in the body of the text), etc. Moreover, even if identifier 314 does not exactly match metadata for any of the content items stored in the content management system, the content management system may still make intelligent guesses as to which content items might be relevant to the user's query and return similar or related results as possible candidates for the user to choose from. Application 300 and/or plugin 302 may also allow the user to use a sequence of characters and wildcard characters to form a search pattern. One example of this is a regular expression (also called a rational expression).

FIG. 4 shows exemplary code that may be inserted into an application. Example code 400 presented is a snippet of HTML code which can cause a rendering application such as a web browser to display an image (i.e., "dynamicpreview.jpg") that is to be retrieved from "examplecms.com." When the server provides this resource in response to the Hypertext Transfer Protocol (HTTP) request from the application, the server can newly create or freshly update the preview image based on the current version of the content item so that the preview can be dynamically updated. Code 400 can also include the share link (i.e., https//www.examplecms.com/s/pm9ba8ewy/Flight%20Data.xls") to the content item such that when a user clicks on the preview image, the application can navigate directly to the content item.

FIGS. 5A-D show exemplary embodiments of inserting a link or code into a mobile application. Inserting a link or code by a mobile application may be done in much the same way as a desktop application as was shown previously in FIGS. 3A-H. Inserting content in a mobile application by using conventional methods can be more difficult because of the smaller form factor of a mobile device such as a smartphone, a tablet, a wearable computing device, etc. In the example embodiment shown in FIG. 5A, mobile device 500 is equipped with display 502. Mobile device 500 is running mobile application 504, which in this example is a word processor application. Application 504 includes rich text editor 508. The user can use on-screen virtual keyboard 506 and/or other input methods to input letters, numbers, and symbols into text editor 508. In this example, the user is composing a document inside rich text editor 508. The user wishes to embed an audio file in the form of an audio player where cursor 510 is currently located. The audio file the user desires to insert into application 504 is stored in the content management system.

Figure 5A:
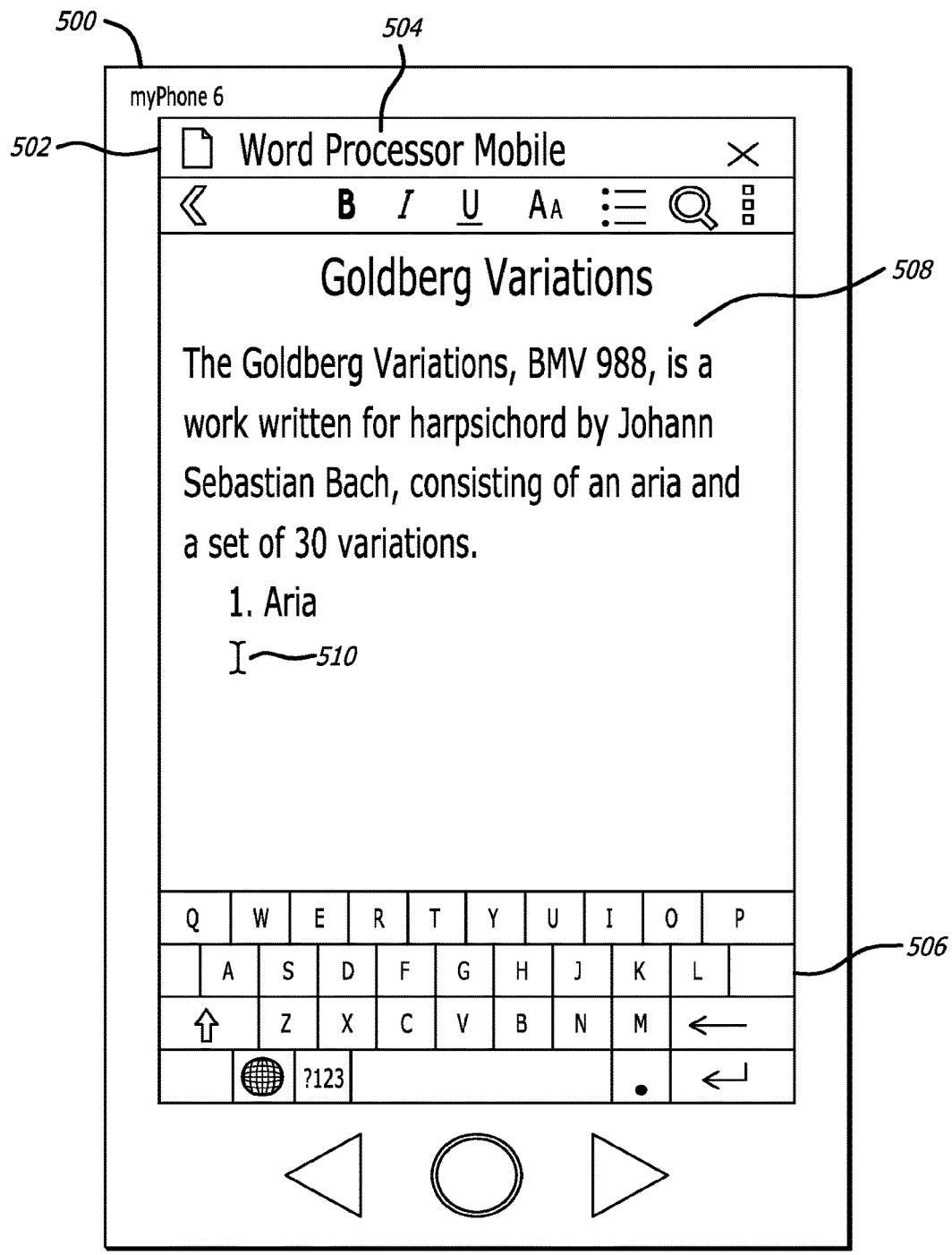
FIGS. 5A-D show exemplary embodiments of inserting a link or code into a mobile application.
Figure 5B:
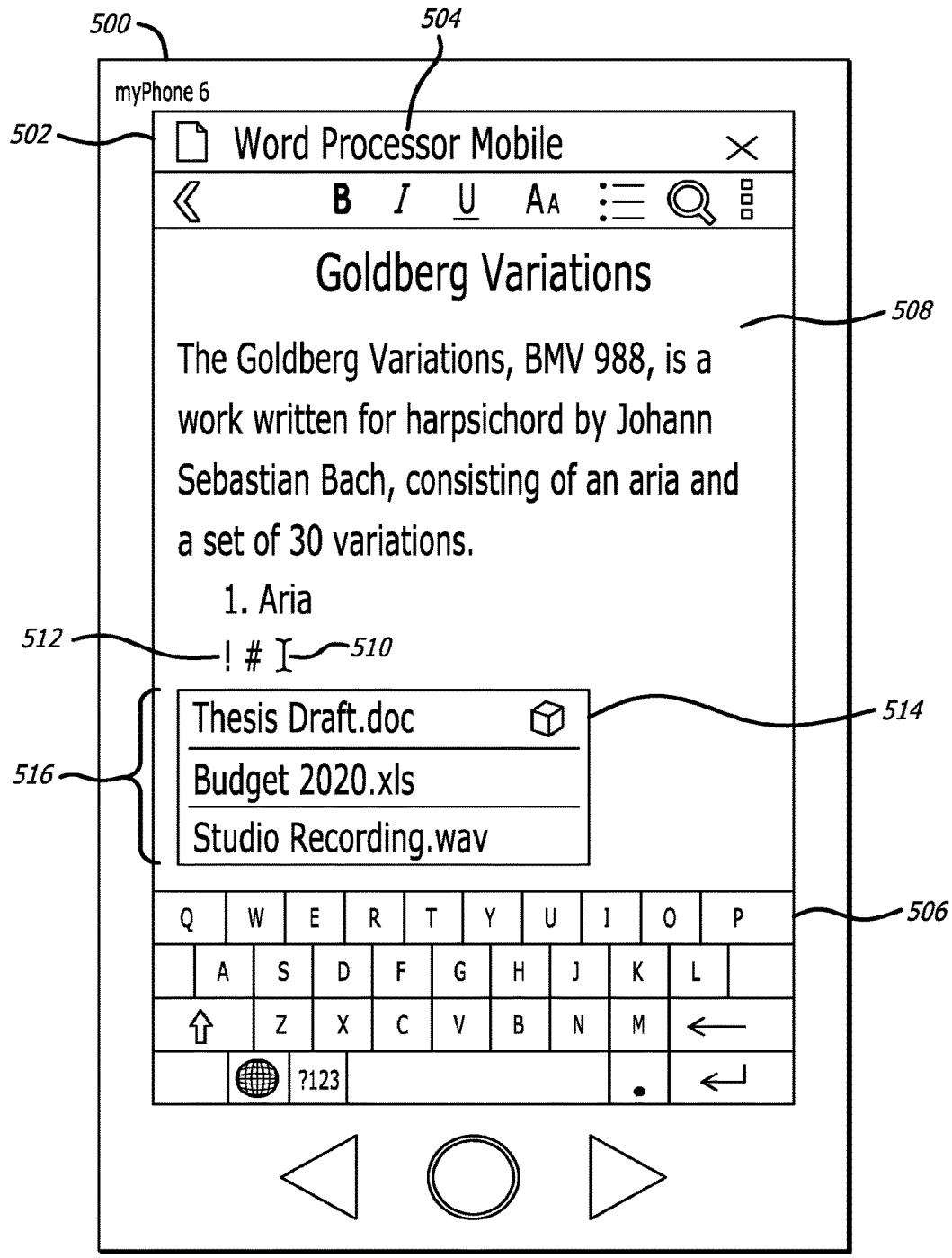

Referring to FIG. 5B, the user inputs escape sequence 512 to signify to application 504 that the user is about to start entering an identifier or a search query. In the example shown in FIG. 5B, escape sequence 512 happens to be a two-character combination "!#". Even though the user at this point has not started entering an identifier or a search query, application 504 can still make one or more intelligent guesses as to which content item the user may be looking for. Such guesses can be made by application 504 and/or the content management server. Application 504 can communicate with the content management server to retrieve a list of likely candidates 516 and display them in candidate presentation area 514. Candidate presentation area 514 can be a pop-up window. Even though the user has yet to provide an identifier or search query, application 504 can populate pop-up window 514 with suggested content items based on one or more selection criteria including the user's most recently accessed content, most frequently accessed content, content with longest accumulative access time, content with longest average access time, user preferences (i.e., "favorites"), user ratings, etc. In one example, selection candidates 516 may include the three most recently accessed content items by the user. The one or more of these criteria can be weighted such that one criterion might be given higher priority over another. Instead of continuing to type, the user can select an entry from one of the content items suggested by application 504.

Figure 5C:
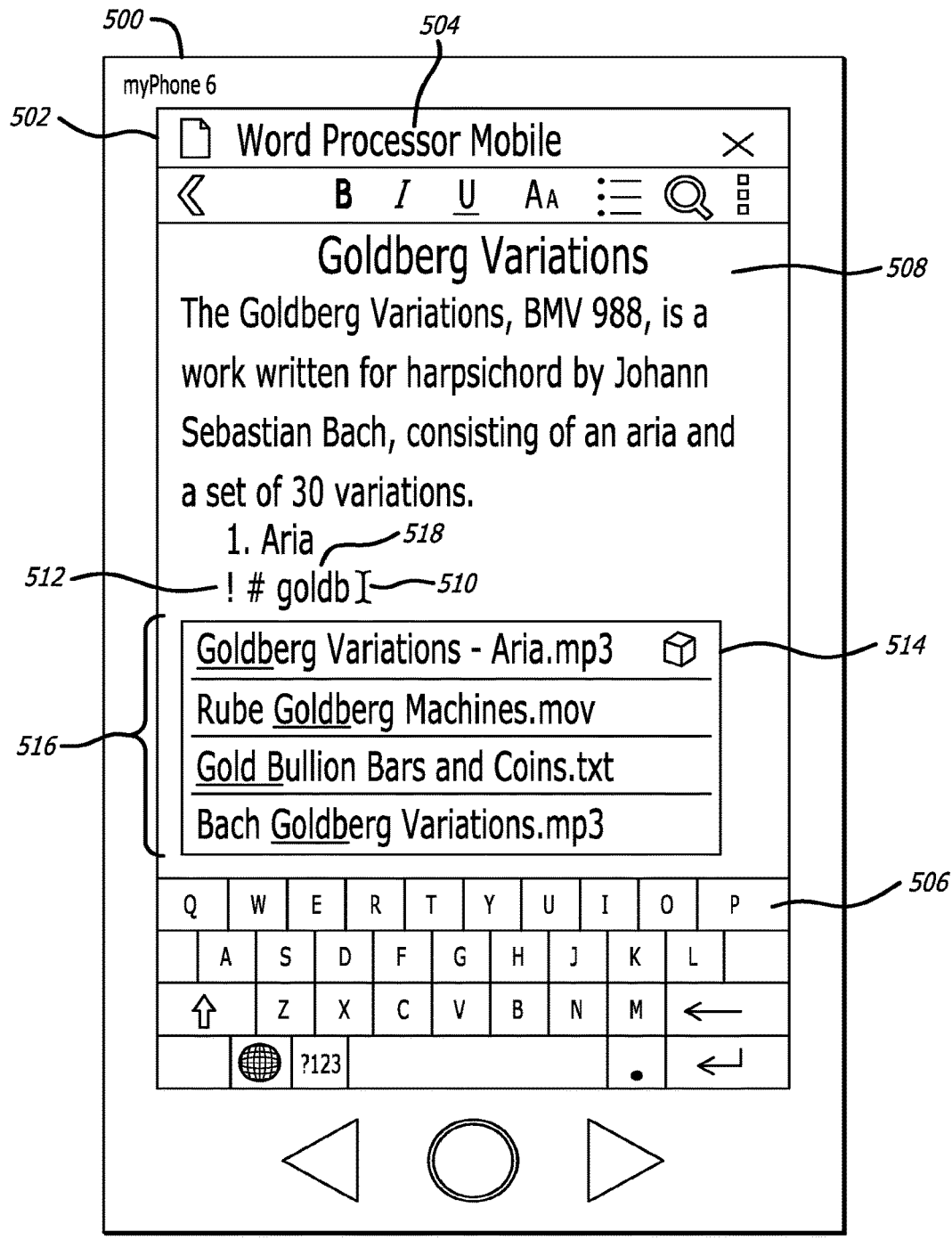

Referring now to FIG. 5C, the user has now typed a few more characters after escape sequence 512. The characters that follow escape sequence 512 can be a partial string of identifier 518. As discussed above, identifier 518 can be uniquely associated with a content item. Based on the partially typed identifier 518, application 504 and/or the server can make intelligent guesses as to which content item the user might be searching for. Thus, application 504 can suggest some content items whose attributes or metadata match identifier 518 to varying degrees.

Figure 5D:
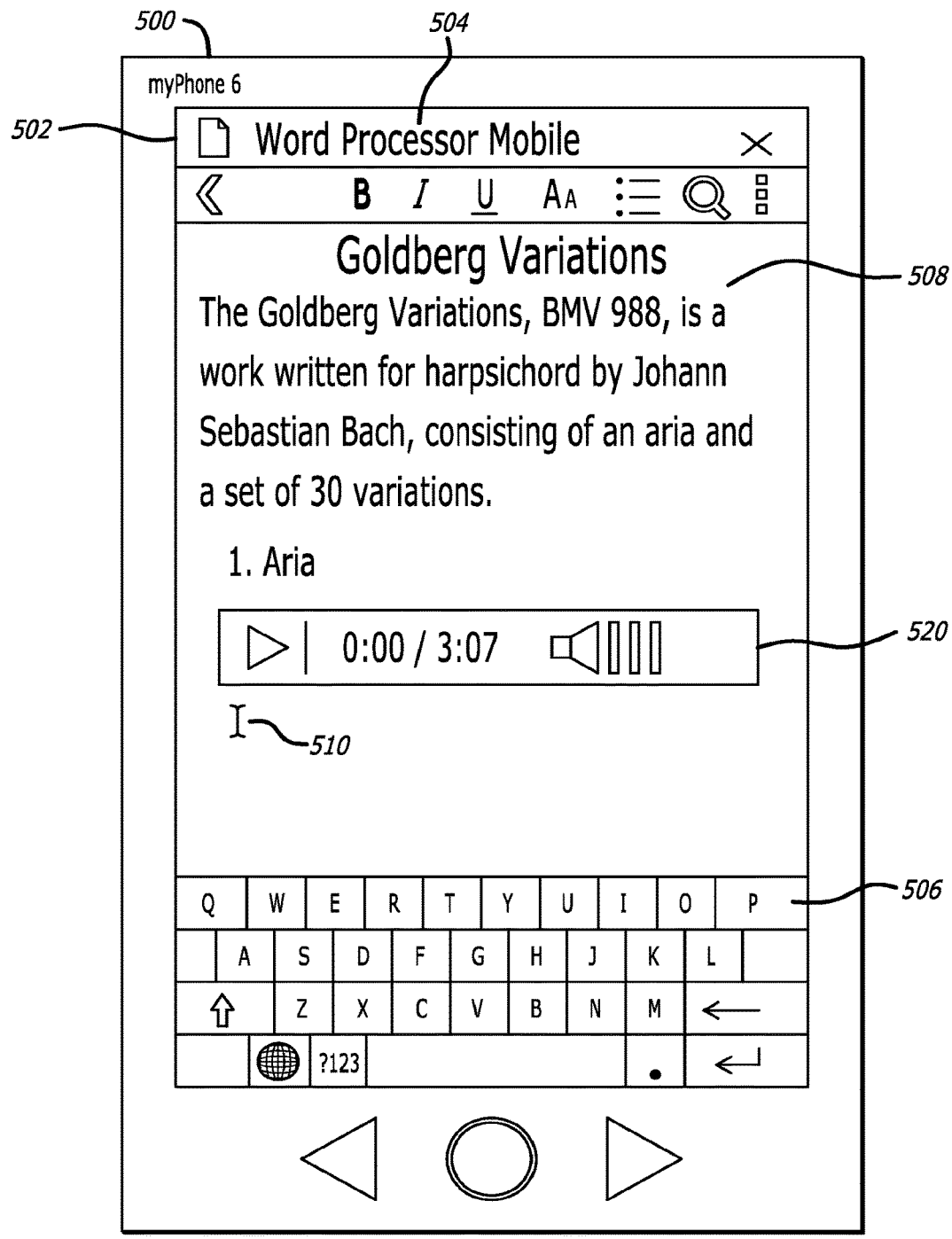

Continuing on to FIG. 5D, the user has either finished typing identifier 514 or made a selection of a content item by tapping the item from the list of candidates 516 presented in pop-up window 514. Application 504 and/or the server can determine the content type of the content item to be inserted (e.g., music) and embed code that can be rendered as the appropriate type of preview (e.g., music player). The code can include a share link that points to the corresponding content item. In the alternative, a hyperlink based on the share link, instead of the code for the preview, can be inserted into text editor 508.

Figure 6:
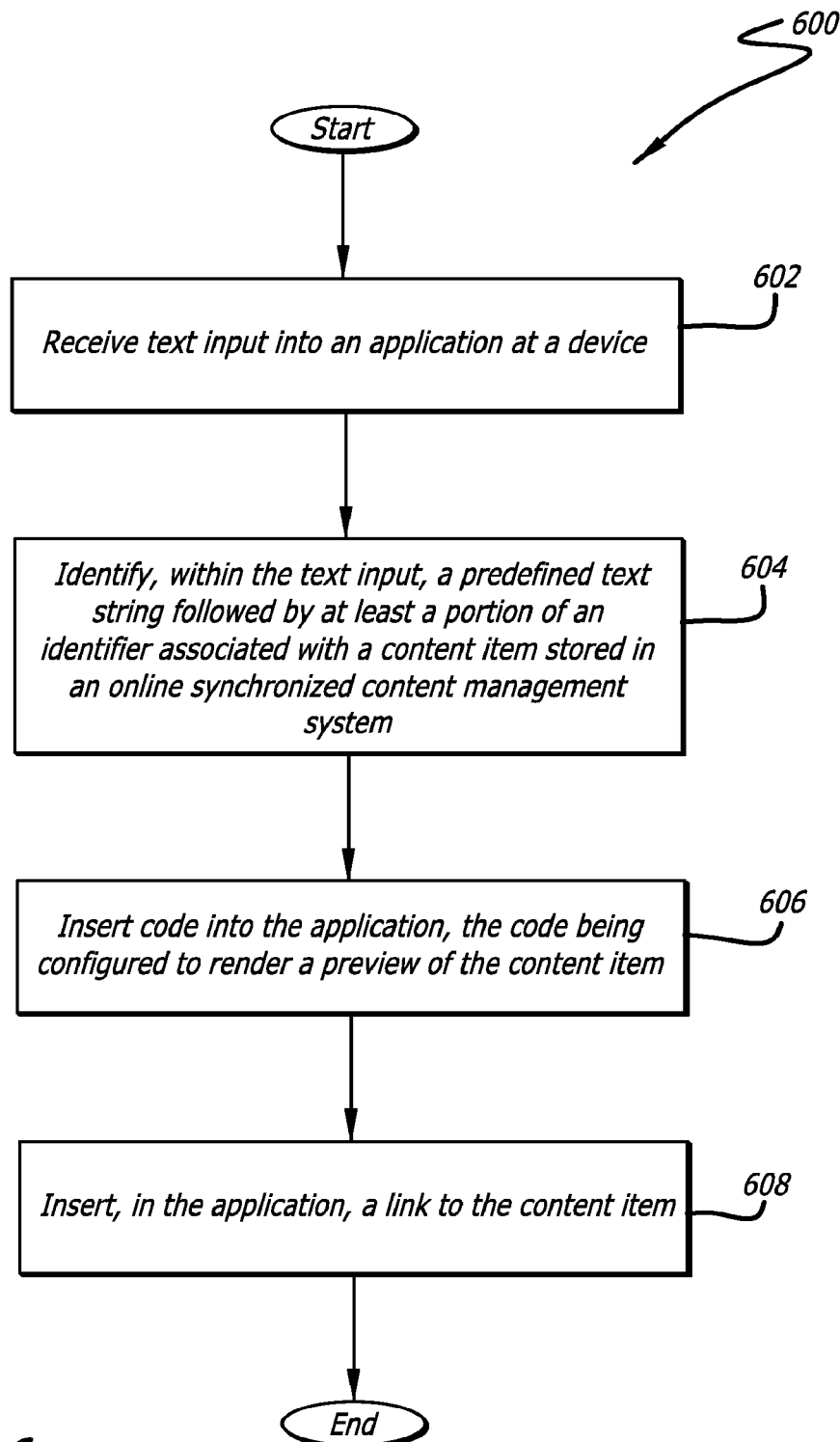
FIG. 6 shows an exemplary method of inserting a link to a content item in an application.
Figure 7:
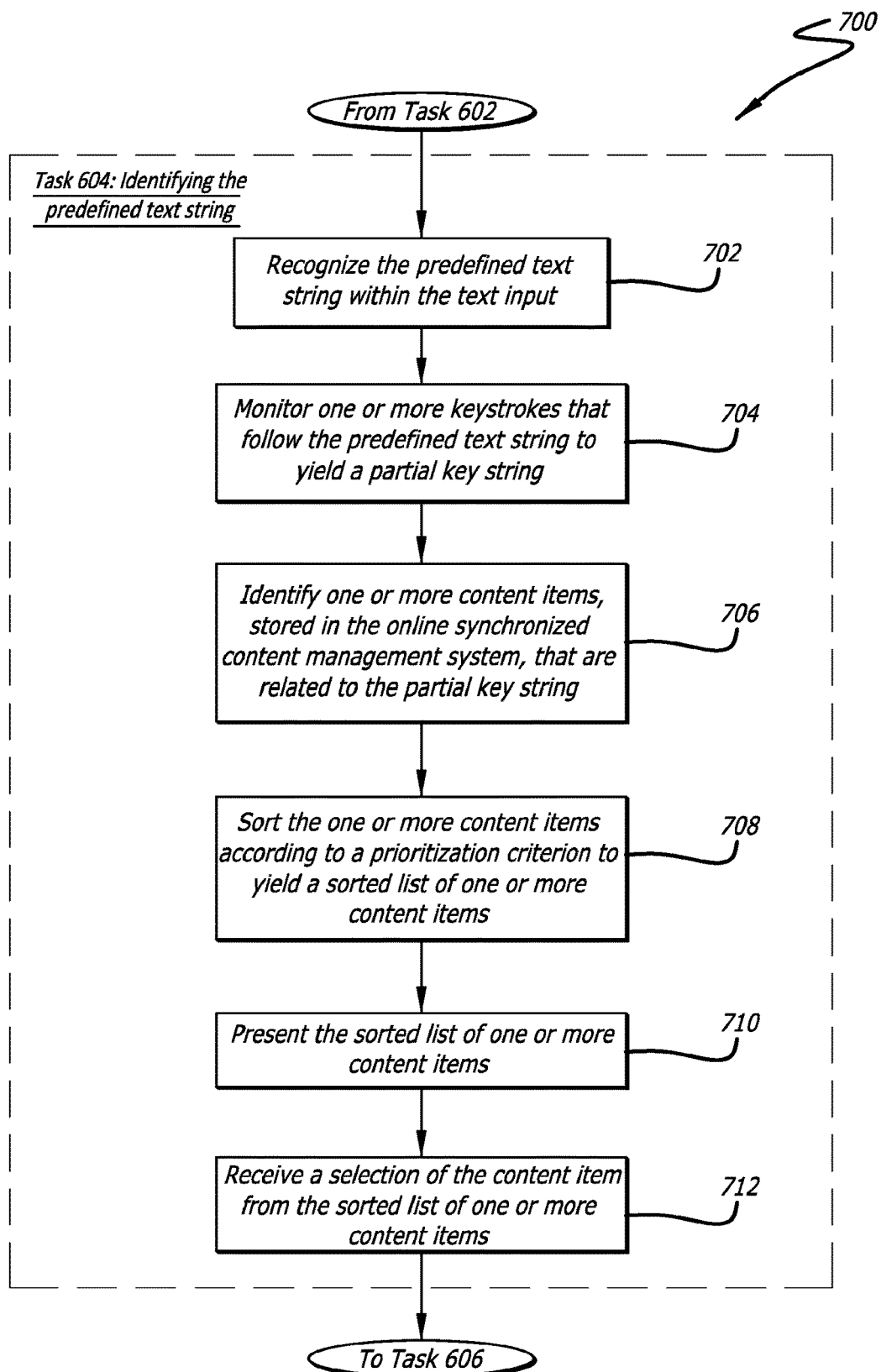
FIG. 7 shows an exemplary method of identifying a predefined text string.
Figure 8:
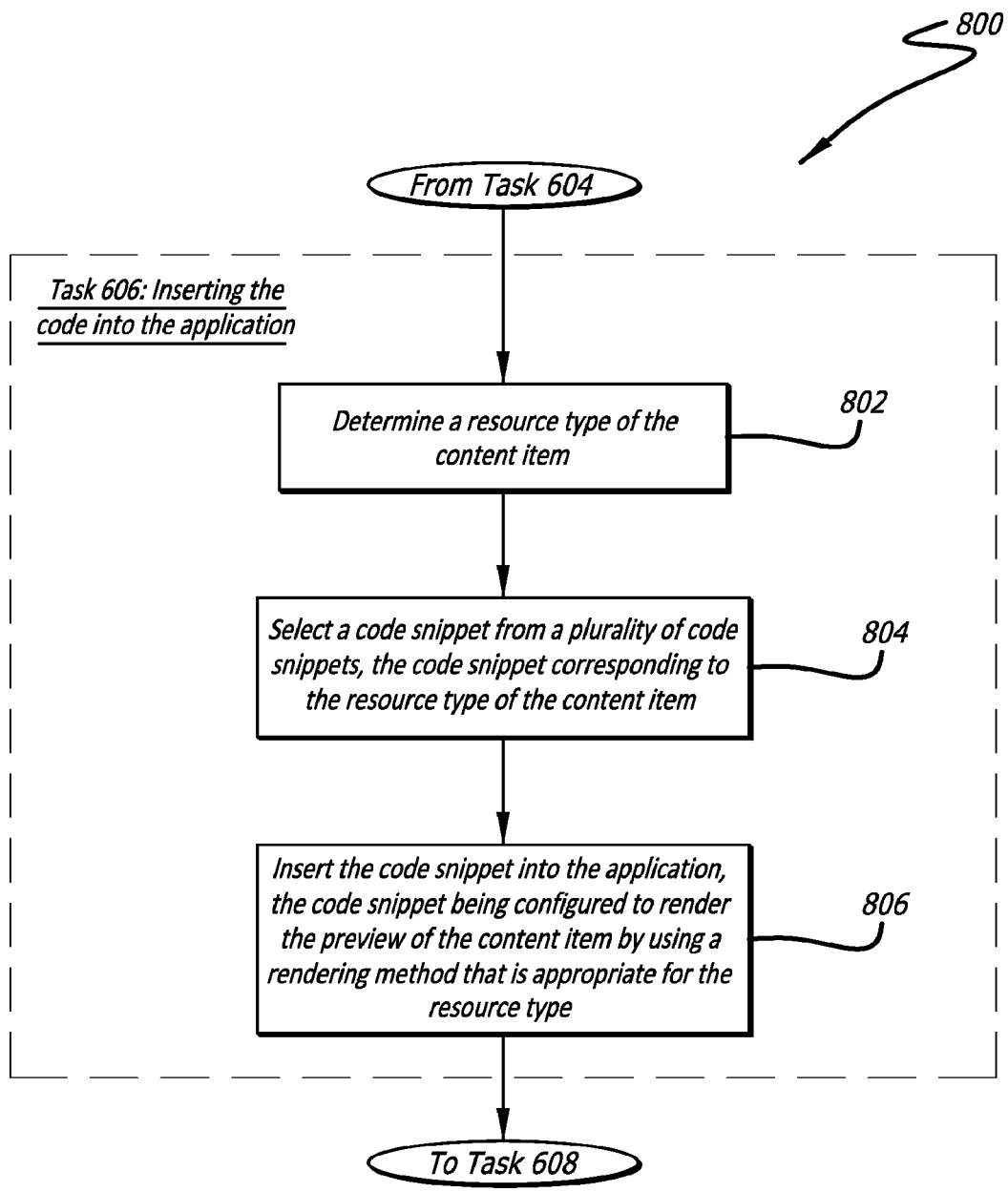
FIG. 8 shows an exemplary method of inserting code into an application.
Figure 9:
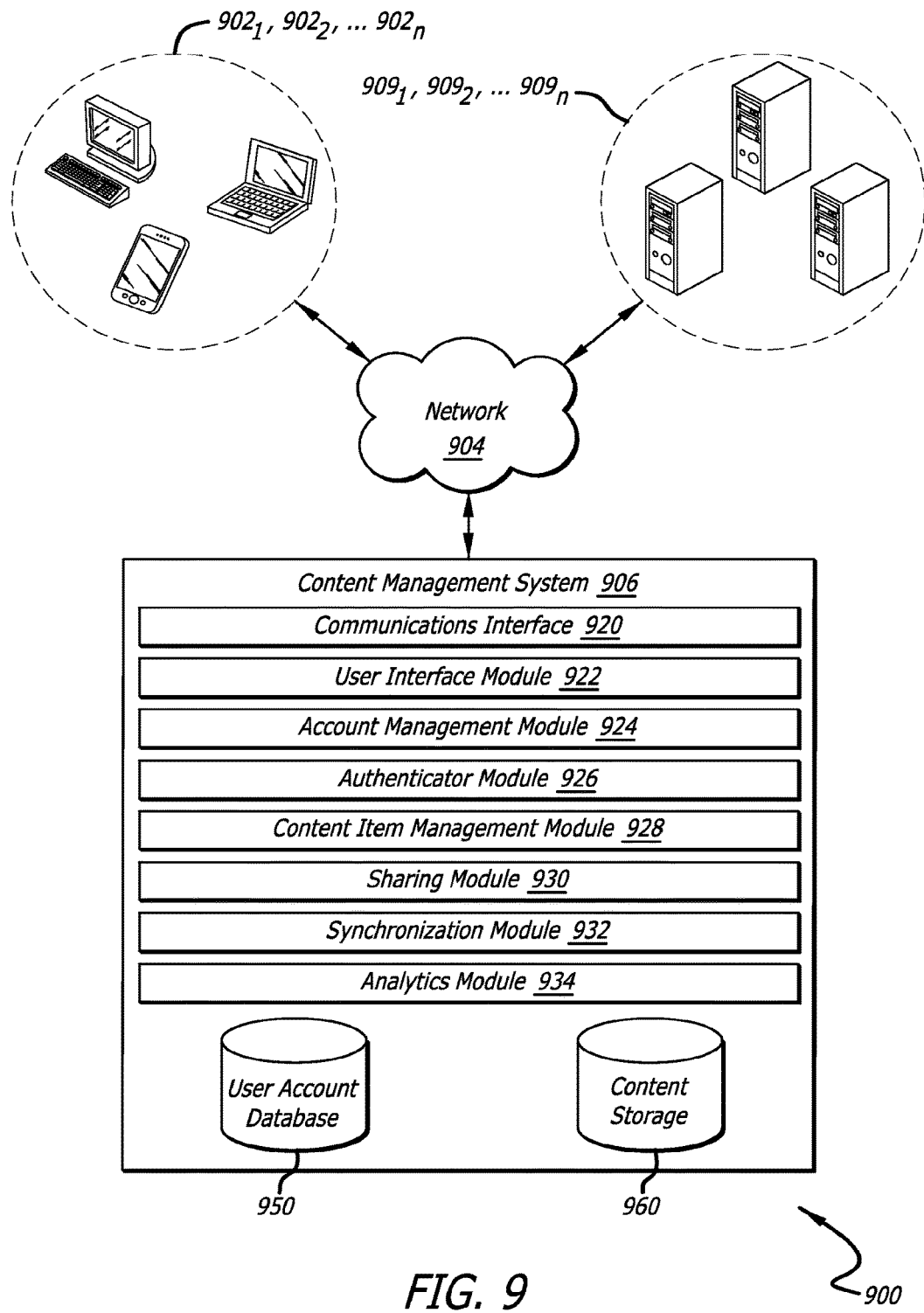
FIG. 9 shows an exemplary configuration of devices and a network in accordance with the invention.

Having disclosed some basic concepts, the disclosure now turns to the example method embodiments shown in FIGS. 6-8. For the sake of clarity, the methods are described in terms of system 900, as shown in FIG. 9 and discussed below in more detail, configured to practice the method. Alternatively, however, the method may also be practiced by system 1000 as shown in FIG. 10A or system 1050 as shown in FIG. 10B. The steps outlined herein are exemplary and can be implemented in any combination thereof in any order, including combinations that exclude, add, or modify certain steps.

FIG. 6 shows an exemplary method of inserting a link to a content item in an application. System 900 can receive text input into an application at a device (602). The device may be a client device associated with an online synchronized content management system. The text input can be made by a user of the client device. Furthermore, the application can be a client-side application such as an email application, a web browser, a text editor, a word processor, a spreadsheet application, a presentation tool, a communicator, a text messenger, an instant messenger, etc. The application may also be system software (e.g., operating system), add-on software, a plugin, an or extension. System 900 can then identify, within the text input, a predefined text string followed by at least a portion of an identifier associated with a content item stored in an online synchronized content management system (604). The predefined text string may an escape sequence consisting of one or more characters arranged in a predefined order. Identifying the predefined text string can be performed by a client application associated with the online synchronized content management system, a plugin, an extension, a desktop application, and/or a mobile application.

System 900 can insert code into the application, the code being configured to render a preview of the content item (606). The preview may be an image, a video clip, or an audio clip that represents at least a portion of the content item. The code can be, for example, HTML code. The code can include a link that points to the content item. System 900 may also insert, in the application, a link to the content item (608). This can be performed by a client application associated with the online synchronized content management system, a plugin, an extension, a desktop application, or a mobile application. The link can be a hyperlink that includes a URL to the content item. Inserting the link in the application can be done by replacing the predefined text string and the portion of the identifier in the text input with the link.

FIG. 7 shows an exemplary method of identifying a predefined text string. Specifically, the tasks shown in FIG. 7 can represent the detailed tasks performed by system 900 for task 604 in FIG. 6. However, one or more of the tasks shown in FIG. 7 may be performed in any order before, after or in conjunction with any of the tasks shown in FIG. 6. System 900 may recognize the predefined text string within the text input (702). The text input can be obtained by a user of the client device. The predefined text string may be an escape sequence that signifies to system 900 that one or more characters corresponding to an identifier is about to follow. Thus, system 900 may monitor one or more keystrokes that follow the predefined text string to yield a partial key string (704). The keystrokes need not be limited to inputs made with a physical keyboard. Instead, a keystroke can be obtained by other means of input such as a virtual keyboard, a stylus, swiping gesture, a voice command, etc. System 900 may identify one or more content items, stored in the online synchronized content management system, that are related to the partial key string (706). The partial key string may correspond to a portion of a filename, a user name, a file type, a metadata, and/or a file content.

System 900 may sort the one or more content items according to a prioritization criterion to yield a sorted list of one or more content items (708). The prioritization criterion may pertain to string similarity, relevance, access time (e.g., when was it last accessed, for how long, how often, etc.), user preference, user ratings, sharing status, and/or file size. Each of these factors can be weighted and a final score can be calculated based on the weights assigned to the factors. A user can specify that one or more content items be always placed at certain spots on the list by "pinning" them. Once the list is candidate content items is created and sorted, system 900 can present the sorted list of one or more content items (710). The user can interact with the user interface to view the list and make a selection of one of the content items. The user may also choose to continue inputting text to get better results with the recommended items. System 900 can receive a selection of the content item from the sorted list of one or more content items (712). System 900 can use the selected content item to insert a link or code into the application.

FIG. 8 shows an exemplary method of inserting a code snippet in an application. Specifically, the tasks shown in FIG. 8 can represent the detailed tasks performed by system 900 for task 606 in FIG. 6. However, one or more of the tasks shown in FIG. 7 may be performed in any order before, after or in conjunction with any of the tasks shown in FIG. 6. System 900 may determine a resource type of the content item (802). The resource type may include text, word processor document, spreadsheet document, video, audio, interactive content, or any combination thereof. The resource type may be further defined by what type of encoding method, compression method, file format, rendering application, etc. have been used. The resource type may also correspond to MIME classifications. System 900 may then select a code snippet from a plurality of code snippets, the code snippet corresponding to the resource type of the content item (804). The code snippets can be code templates that are stored within a client device or downloaded from the server. Each code snippet may be designed to render a specific type of resource. For example, one code template may be used for rendering a music file while another code template may be used for rendering a slideshow. In some cases, universal code templates may be used to render multiple types of resources. For instance, a universal template that is designed to render a still snapshot image of the content item can be used regardless of the item's content type.

System 900 can finally insert the code snippet into the application, the code snippet being configured to render the preview of the content item by using a rendering method that is appropriate for the resource type (806). The preview can be generated by and retrieved from a server associated with the online synchronized content management system. The preview can be dynamically generated and updated, meaning that it can be updated whenever the underlying content item is updated.

FIG. 9 shows an exemplary configuration of devices and a network in accordance with the invention. An exemplary system configuration 900 for enabling access to content of a compressed content item from a variety of computing devices is shown in FIG. 9, wherein computing devices communicate via a network for purposes of exchanging content and other data. The system can be configured for use on a wide area network such as that illustrated in FIG. 9. However, the present principles are applicable to a wide variety of network configurations that facilitate the intercommunication of electronic devices. For example, each of the components of system 900 in FIG. 9 can be implemented in a localized or distributed fashion in a network.

In system 900, a user can interact with online content management system 906 through computing devices $902_1$, $902_2$, . . . , $902_n$ (collectively "902," also known as client devices) connected to network 904 by direct and/or indirect communication. Content management system 906 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 902 can be of varying type, capabilities, operating systems, etc. Furthermore, content management system 906 can concurrently accept connections from and interact with multiple computing devices 902.

A user can interact with content management system 906 via a client-side application installed on computing device $902_i$. In some embodiments, the client-side application can include a content management system specific component. For example, the component can be a stand-alone application, one or more application plug-ins, and/or a browser extension. However, the user can also interact with content management system 906 via a third-party application, such as a web browser, that resides on computing device $902_i$ and is configured to communicate with content management system 906. In either case, the client-side application can present a user interface (UI) for the user to interact with content management system 906. For example, the user can interact with the content management system 906 via a client-side application integrated with the file system or via a webpage displayed using a web browser application. Each of computing devices 902 and any client-side or third-party applications running on computing devices 902 may be considered an access platform, by which a user may access synchronized content on content management system 906.

Content management system 906 (also known as "online synchronized content management system," "file hosting service," "cloud storage service," "online file synchronization service," etc.) can make it possible for a user to store content, as well as perform a variety of content management tasks, such as retrieve, modify, browse, and/or share the content. Furthermore, content management system 906 can make it possible for a user to access the content from multiple computing devices 902. For example, computing device $902_i$ can upload content to content management system 906 via network 904. The content can later be retrieved from content management system 906 using the same computing device $902_i$ or some other computing device $902_j$. Although the term "online synchronized content management system" and its variants are typically used to refer to the server-side or administrator-side of system 900, they can also be used as an umbrella term for system 900 itself, which includes the entire eco-system of client devices 902, content providers 909, network 904, and the servers.

To facilitate the various content management services, a user can create an account with content management system 906. The account information can be maintained in user account database 950. User account database 950 can store profile information for registered users. In some cases, the only personal information in the user profile can be a username and/or email address. However, content management system 906 can also be configured to accept additional user information.

User account database 950 can also include account management information, such as account type, e.g. free or paid; usage information, e.g. file edit history; maximum storage space authorized; storage space used; content storage locations; security settings; personal configuration settings; content sharing data; etc. Account management module 924 can be configured to update and/or obtain user account details in user account database 950. Account management module 924 can be configured to interact with any number of other modules in content management system 906.

An account can be used to store content, such as digital data, documents, text files, audio files, video files, etc., from one or more computing devices 902 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 960. Content storage 960 can be a storage device, multiple storage devices, or a server. Alternatively, content storage 960 can be a cloud storage provider or network storage accessible via one or more communications networks. Content management system 906 can hide the complexity and details from computing devices 902 so that computing devices 902 do not need to know exactly where the content items are being stored by content management system 906. In one variation, content management system 906 can store the content items in the same folder hierarchy as they appear on computing device $902_i$. However, content management system 906 can store the content items in its own order, arrangement, or hierarchy. Content management system 906 can store the content items in a network accessible storage (SAN) device, in a redundant array of inexpensive disks (RAID), etc. Content storage 960 can store content items using one or more partition types, such as FAT, FAT32, NTFS, EXT2, EXT3, EXT4, ReiserFS, BTRFS, and so forth.

Content storage 960 can also store metadata describing content items, content item types, and the relationship of content items to various accounts, folders, or groups. The metadata may also include identifiers, as discussed above, which may function as shortcuts for inserting content into an application. The metadata for a content item can be stored as part of the content item or can be stored separately. In one variation, each content item stored in content storage 960 can be assigned a system-wide unique identifier.

Content storage 960 can decrease the amount of storage space required by identifying duplicate files or duplicate segments of files. Instead of storing multiple copies, content storage 960 can store a single copy and then use a pointer or other mechanism to link the duplicates to the single copy. Similarly, content storage 960 can store files more efficiently, as well as provide the ability to undo operations, by using a file version control that tracks changes to files, different versions of files (including diverging version trees), and a change history. The change history can include a set of changes that, when applied to the original file version, produce the changed file version. Content storage 960 can also include an activity journal that keeps track of each user's content access history such as creating, adding, opening, viewing, downloading, modifying, or sharing content.

Content management system 906 can be configured to support automatic synchronization of content from one or more computing devices 902. The synchronization can be platform agnostic. That is, the content can be synchronized across multiple computing devices 902 of varying type, capabilities, operating systems, etc. For example, computing device $902_i$ can include client software, which synchronizes, via a synchronization module 932 at content management system 906, content in computing device $902_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 906. Conversely, the background process can identify content that has been updated at content management system 906 and synchronize those changes to the local folder. The client software can provide notifications of synchronization operations, and can provide indications of content statuses directly within the content management application. Sometimes computing device $902_i$ may not have a network connection available. In this scenario, the client software can monitor the linked folder for file changes and queue those changes for later synchronization to content management system 906 when a network connection is available. Similarly, a user can manually stop or pause synchronization with content management system 906.

A user can also view or manipulate content via a web interface generated and served by user interface module 922. For example, the user can navigate in a web browser to a web address provided by content management system 906. Changes or updates to content in the content storage 960 made through the web interface, such as uploading a new version of a file, can be propagated back to other computing devices 902 associated with the user's account. For example, multiple computing devices 902, each with their own client software, can be associated with a single account and files in the account can be synchronized between each of the multiple computing devices 902.

Content management system 906 can include communications interface 920 for interfacing with various computing devices 902, and can interact with other content and/or service providers $909_1, 909_2, \ldots, 909_n$ (collectively "909") via an Application Programming Interface (API). Certain software applications can access content storage 960 via an API on behalf of a user. For example, a software package, such as an app on a smartphone or tablet computing device, can programmatically make calls directly to content management system 906, when a user provides credentials, to read, write, create, delete, share, or otherwise manipulate content. Similarly, the API can allow users to access all or part of content storage 960 through a web site. Applications or add-one software running on a client device can interact with communication interface 920 to exchange data about generating and providing likely candidate content items for inserting into an application.

Content management system 906 can also include authenticator module 926, which can verify user credentials, security tokens, API calls, specific computing devices, and so forth, to ensure only authorized clients, web browsers, and users can access files. Authenticator module 926 may generate security codes, tokens, or nonces. Authenticator module 926 may also store the codes, tokens, and nonces generated by authenticator module 926 or received from client applications in, for example, user account database 950. Authenticator module 926 can compare the stored values with the values of codes, tokens, and nonces received from web browsers to authenticate the web browsers. Further, content management system 906 can include analytics module 934 module that can track and report on aggregate file operations, user actions, network usage, total storage space used, as well as other technology, usage, or business metrics. A privacy and/or security policy can prevent unauthorized access to user data stored with content management system 906.

Content management system 906 can include sharing module 930 for managing sharing content publicly or privately. Sharing content publicly can include making the content item accessible from any computing device in network communication with content management system 906. Sharing content privately can include linking a content item in content storage 960 with two or more user accounts so that each user account has access to the content item. The sharing can be performed in a platform agnostic manner. That is, the content can be shared across multiple computing devices 902 of varying type, capabilities, operating systems, etc. The content can also be shared across varying types of user accounts.

In some embodiments, content management system 906 can include a content item management module 928 for maintaining a content directory. The content directory can identify the location of each content item in content storage 960. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 906 can use the content path to present the content items in the appropriate folder hierarchy.

A content entry can also include a content pointer that identifies the location of the content item in content storage 960. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 930 can be configured to add a user account identifier to the content entry associated with the content item, thus granting the added user account access to the content item. Sharing module 930 can also be configured to remove user account identifiers from a content entry to restrict a user account's access to the content item.

To share content publicly, sharing module 930 can be configured to generate a custom network address, such as a uniform resource locator (URL), which allows any web browser to access the content in content management system 906 without any authentication. To accomplish this, sharing module 930 can be configured to include content identification data in the generated URL, which can later be used to properly identify and return the requested content item. For example, sharing module 930 can be configured to include the user account identifier and the content path in the generated URL. Upon selection of the URL, the content identification data included in the URL can be transmitted to content management system 906 which can use the received content identification data to identify the appropriate content entry and return the content item associated with the content entry.

In addition to generating the URL, sharing module 930 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 930 can be configured to change the value of the flag to 1 or true after generating a URL to the content item.

In some embodiments, sharing module 930 can also be configured to deactivate a generated URL. For example, each content entry can also include a URL active flag indicating whether the content should be returned in response to a request from the generated URL. For example, sharing module 930 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 930 can reactivate the URL by again changing the value of the URL active flag to 1 or true. A user can thus easily restore access to the content item without the need to generate a new URL.

Sharing module 930 can also be configured to generate dynamic previews for content items being inserted or embedded into applications. For example, sharing module 930 can take a snapshot image of a content item whenever the content item is updated or when a client device requests a preview.

While content management system 906 is presented with specific components, it should be understood by one skilled in the art, that the architectural configuration of system 906 is simply one possible configuration and that other configurations with more or less components are also possible.

FIGS. 10A and 10B show exemplary system embodiments. Various devices disclosed throughout this disclosure, such as servers, client devices and virtual devices, may be implemented as system 1000 of FIG. 10A or system 1050 of FIG. 10B. The more appropriate embodiment will be apparent to those of ordinary skill in the art when practicing the present technology. Persons of ordinary skill in the art will also readily appreciate that other system embodiments are possible.

FIG. 10A shows a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B shows a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1050 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
   detecting text input into an application at a device by software associated and configured to communicate with a server associated with a content management system, the content management system associated with the device, and the device authorized at the content management system;
   identifying by the software, within the text input, a predefined text string followed by at least a portion of an identifier associated with a content item stored at the content management system;
   sending by the software to the server at least the portion of the identifier associated with the content item;
   receiving, by the software from the server, a link to the content item identified in accordance with the text input;
   inserting, in the application by the software, the link to the content item;
   receiving from the server by the software, an up-to-date preview of the content item associated with the link to the content item and identified in accordance with the text input; and
   inserting code into the application by the software, the code being configured to render the up-to-date preview of the content item.

2. The method of claim 1, wherein the predefined text string comprises one or more characters arranged in a predefined order.

3. The method of claim 1, wherein identifying the predefined text string and inserting the link by the software are performed by one of a client application associated with the content management system, a plugin, an extension, a desktop application, or a mobile application.

4. The method of claim 1, wherein the application is one of an email application, a web browser, a word processor, a text editor, a communicator, a text messenger, an instant messenger, or an operating system.

5. The method of claim 1, wherein inserting the link in the application comprises replacing the predefined text string and the at least the portion of the identifier in the text input with the link.

6. The method of claim 1, wherein the link is a hyperlink comprising a universal resource locator (URL) to the content item.

7. The method of claim 1, wherein the code is hypertext markup language (HTML) code.

8. The method of claim 1, wherein the code comprises the link.

9. The method of claim 1, wherein the up-to-date preview of the content item is one of an image, a video clip, or an audio clip representing at least a portion of the content item.

10. The method of claim 1, wherein inserting the code into the application comprises:
    determining a resource type of the content item;
    selecting a code snippet from a plurality of code snippets, the code snippet corresponding to the resource type of the content item; and
    inserting the code snippet into the application, the code snippet being configured to render the up-to-date preview of the content item by using a rendering method that is appropriate for the resource type.

11. The method of claim 1, wherein the up-to-date preview of the content item is generated by and retrieved by the software from the server associated with the content management system.

12. The method of claim 1, wherein the up-to-date preview of the content item is updated when the content item is updated.

13. The method of claim 1, wherein identifying the predefined text string comprises:
    recognizing the predefined text string within the text input;
    monitoring one or more keystrokes that follow the predefined text string to yield a partial key string;
    identifying one or more content items, stored in the content management system, that are related to the partial key string;
    sorting the one or more content items according to a prioritization criterion to yield a sorted list of one or more content items;
    presenting the sorted list of one or more content items; and
    receiving a selection of the content item from the sorted list of one or more content items.

14. The method of claim 13, wherein the partial key string corresponds to a portion of one of a filename, a user name, a file type, a metadata, or a file content.

15. The method of claim 13, wherein the prioritization criterion pertains to one of access time, access duration, access frequency, relevance, preference, sharing status, file size, or string similarity.

16. A system comprising:
    one or more processors; and
    at least one computer-readable storage medium storing instructions which, when executed by the one or more processors, cause the system to:
    detect text input into an application at a device by software associated and configured to communicate with a server associated with a content management system, the content management system associated with the device, and the device authorized on an account in the content management system;

identify by the software, within the text input, a predefined text string followed by at least a portion of an identifier associated with a content item stored in the account at the content management system;

send by the software to the server at least a portion of the identifier associated with the content item stored in the account;

receive, by the software from the server, a link to the content item stored in the account identified in accordance with the text input;

insert, in the application by the software, the link to the content item;

receive from the server by the software, an updated preview of the content item associated with the link to the content item and identified in accordance with the text input; and insert code into the application by the software, the code being configured to render the updated preview of the content item that represents at least a portion of the content item associated with the link to the content item and identified in accordance with the text input.

17. A non-transitory computer-readable storage device storing instructions which, when executed by one or more processors, cause the one or more processors to perform operations comprising:

detecting text input into an application at a device by software associated and configured to communicate with a server associated with a synchronized content management system, the content management system associated with the device, and the device authorized at the content management system;

identifying by the software, within the text input, a predefined text string followed by at least a portion of an identifier associated with a content item stored in an account at the content management system;

sending by the software to the server at least a portion of the identifier associated with the content item stored in the account;

receiving, by the software from the server, a link to the content item stored in the account in accordance with the text input;

inserting, in the application by the software, the link to the content item;

receiving from the server by the software, an updated preview of the content item associated with the link to the content item and identified in accordance with the text input; and inserting code into the application by the software, the code being configured to render the updated preview of the content item associated with the link to the content item and identified in accordance with the text input.

18. The non-transitory computer-readable storage device of claim 17, wherein identifying the predefined text string comprises:

recognizing the predefined text string within the text input;

monitoring one or more keystrokes that follow the predefined text string to yield a partial key string;

identifying one or more content items, stored in the content management system, that are related to the partial key string; and receiving a selection of the content item from the one or more content items.

* * * * *